US008755384B2

(12) United States Patent
Nakashima et al.

(10) Patent No.: US 8,755,384 B2
(45) Date of Patent: Jun. 17, 2014

(54) NETWORK APPARATUS AND NETWORK MANAGING APPARATUS

(75) Inventors: Kohta Nakashima, Kawasaki (JP); Akira Naruse, Machida (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/455,757

(22) Filed: Apr. 25, 2012

(65) Prior Publication Data

US 2013/0022047 A1   Jan. 24, 2013

(30) Foreign Application Priority Data

Jul. 19, 2011   (JP) ................................ 2011-158460

(51) Int. Cl.
  *H04L 12/56*   (2006.01)
(52) U.S. Cl.
  USPC ......................................................... 370/392
(58) Field of Classification Search
  CPC ........ H04L 49/358; H04L 49/00; H04L 49/15
  USPC ......................................... 370/351, 389, 392
  See application file for complete search history.

(56) References Cited

U.S. PATENT DOCUMENTS

| 4,970,505 | A | * | 11/1990 | Hirata et al. | 340/2.22 |
| 8,175,107 | B1 | * | 5/2012 | Yalagandula et al. | 370/408 |
| 2009/0016332 | A1 | * | 1/2009 | Aoki et al. | 370/388 |
| 2010/0088437 | A1 | * | 4/2010 | Zahavi | 710/36 |
| 2011/0302346 | A1 | * | 12/2011 | Vahdat et al. | 710/301 |
| 2012/0151090 | A1 | * | 6/2012 | Nakashima et al. | 709/238 |
| 2012/0300669 | A1 | * | 11/2012 | Zahavi | 370/254 |

OTHER PUBLICATIONS

M. Valerio, et al., "Using Fat-Trees to Maximize the Number of Processors in a Massively Parallel Computer", Department of Electrical and Computer Engineering University of California, Santa Barbara, pp. 128-134 (1993).
Öhring, S. R. et al., "On Generalized Fat Trees," Parallel Processing Symposium, Proceedings, 9th International, Santa Barbara, CA, IEEE, Apr. 25-28, 1995, pp. 37-44, XP010135941.
Petrini, F. et al., "k-ary n-trees: High Performance Networks for Massively Parallel Architectures," Parallel Processing Symposium, Genva, Switzerland, Apr. 1-5, 1997, pp. 87-93, XP010216765.
Zahavi, E., "D-MOD-K Routing Providing Non-Blocking Traffic for Shift Permutations on Real Life Fat Trees," Irwin and Joan Jacobs, Center for Communication and Information Technologies Report #776, Sep. 2010, pp. 1-7, XP002686713.
Extended European Search Report dated Nov. 20, 2012 for corresponding European Application No. 12167292.7.

* cited by examiner

*Primary Examiner* — Chi Pham
*Assistant Examiner* — Robert Lopata
(74) *Attorney, Agent, or Firm* — Fujitsu Patent Center

(57) ABSTRACT

First-stage switches (B1 to B9), second-stage switches (M1 to M9), and third-stage switches (T1 to T9) include a bottom connection path that configure to interchange a connection point of one or more second signal transmitting units and a connection point of another one or more second signal transmitting units, in a Fat Tree configuration between the first-stage switches (B1 to B9) and the second-stage switches (M1 to M9) constituting a one-set Fat Tree with the third-stage switches (T1 to T9).

6 Claims, 13 Drawing Sheets

| | | | | |
|---|---|---|---|---|
| M1 | 1 | 1 | 1 | 1 |
| M2 | 2 | 2 | 2 | 2 |
| M3 | 3 | 3 | 3 | 3 |
| M4 | 4 | 4 | 4 | 4 |

602

| | | | | |
|---|---|---|---|---|
| M5 | 1 | 2 | 3 | 4 |
| M6 | 2 | 3 | 4 | 1 |
| M7 | 3 | 4 | 1 | 2 |
| M8 | 4 | 1 | 2 | 3 |

603

| | | | | |
|---|---|---|---|---|
| M9 | 1 | 4 | 2 | 3 |
| M10 | 2 | 3 | 1 | 4 |
| M11 | 3 | 2 | 4 | 1 |
| M12 | 4 | 1 | 3 | 2 |

604

| | | | | |
|---|---|---|---|---|
| M13 | 1 | 3 | 4 | 2 |
| M14 | 2 | 4 | 3 | 1 |
| M15 | 3 | 1 | 2 | 4 |
| M16 | 4 | 2 | 1 | 3 |

| | | | | |
|---|---|---|---|---|
| M1 | B1 | B2 | B3 | B4 |
| M2 | B5 | B6 | B7 | B8 |
| M3 | B9 | B10 | B11 | B12 |
| M4 | B13 | B14 | B15 | B16 |

606

| | | | | |
|---|---|---|---|---|
| M5 | B1 | B6 | B11 | B16 |
| M6 | B5 | B2 | B15 | B12 |
| M7 | B9 | B14 | B3 | B8 |
| M8 | B13 | B10 | B7 | B4 |

607

| | | | | |
|---|---|---|---|---|
| M9 | B1 | B14 | B7 | B12 |
| M10 | B5 | B10 | B3 | B16 |
| M11 | B9 | B6 | B15 | B4 |
| M12 | B13 | B2 | B11 | B8 |

608

| | | | | |
|---|---|---|---|---|
| M13 | B1 | B10 | B15 | B8 |
| M14 | B5 | B14 | B11 | B4 |
| M15 | B9 | B2 | B7 | B16 |
| M16 | B13 | B6 | B3 | B12 |

NETWORK APPARATUS AND NETWORK MANAGING APPARATUS

CROSS-REFERENCE TO RELATED APPLICATION

This application is based upon and claims the benefit of priority of the prior Japanese Patent Application No. 2011-158460, filed on Jul. 19, 2011, the entire contents of which are incorporated herein by reference.

FIELD

The embodiments discussed herein are directed to a network apparatus and a network managing apparatus.

BACKGROUND

In recent years, cluster systems connecting a large number of nodes, for example, servers by a high-speed network have been widely used in the field of HPC (high performance computer). In many cases, such cluster systems perform parallel computation processing. In communication for the parallel computation processing, it is recommended to achieve a low delay and secure a wide band in signal transmission. To this end, InfiniBand-based Fat Tree connections have been widely used, particularly in large-scale cluster systems.

For example, the Fat Tree is a topology having a multiplexed tree-type network configuration such as a configuration illustrated in FIG. 13. FIG. 13 is a diagram illustrating a configuration of a network apparatus having a three-stage Fat Tree. In the Fat Tree, since the number of connection links in each switch is equal in the upper side and the lower side except for the top, a sufficiently wide band can be secured even when transmission is made in either the upward direction or the downward direction.

Herein, switches B1 to B9 illustrated in FIG. 13 will be referred to as first-stage switches. Further, switches M1 to M9 will be referred to as second-stage switches. Further, switches T1 to T9 will be referred to as third-stage switches. In the Fat Tree illustrated in FIG. 13, each of the first-stage switches is connected to three second-stage switches. Further, the switches B1 to B3 are connected to the same second-stage switch. Further, the switches B4 to B6 are connected to the same second-stage switch. Further, the switches B7 to B9 are connected to the same second-stage switch. For example, each of the switches B1 to B3 is connected to the switches M1, M4, and M7.

Further, each of the switches B1 to B9 is connected to three nodes. In FIG. 13, circles connected to the switches B1 to B9 represent nodes. Also, a number marked under each node represents each node number. This node number serves as an address for signal transmission between the nodes. For example, the nodes denoted by node numbers 1 to 3 are connected to the switch B1. Further, the nodes denoted by node numbers 4 to 6 are connected to the switch B2. Hereinafter, the node denoted by a node number P will be referred to as a node P.

Each of the nodes 1 to 27 transmits a signal destined for another node, to the first-stage switch connected to the node itself. Herein, each of the nodes 1 to 27 designates a node number as a destination address of a signal transmitted to another node.

Each of the switches B1 to B9 receives a signal transmitted from the node connected to the switch itself to another node. Then, the switches B1 to B9 transmit signals destined for node numbers of 1 mod 3, to the switches M1 to M3. Further, the switches B1 to B9 transmit signals destined for node numbers of 2 mod 3, to the switches M4 to M6. Further, the switches B1 to B9 transmit signals destined for node numbers of 3(0) mod 3, to the switches M7 to M9. For example, the switch B1 transmits a signal of 1 mod 3 among the signals received from the nodes 1 to 3, to the switch M1 as indicated by an arrow 901. Further, the switch B1 transmits a signal of 2 mod 3 among the signals received from the nodes 1 to 3, to the switch M4 as indicated by an arrow 902. Further, the switch B1 transmits a signal of 3(0) mod 3 among the signals received from the nodes 1 to 3, to the switch M7 as indicated by an arrow 903.

Each of the switches M1 to M9 receives signals that are equal in the remainder of a signal destination node number divided by 3, from the first-stage switches connected thereto. For example, the switch M1 receives a signal having a destination node number of 1 mod 3, from each of the switches B1 to B3. Further, the switch M2 receives a signal having a destination node number of 1 mod 3, from each of the switches B4 to B6. Further, the switch M3 receives a signal having a destination node number of 2 mod 3, from each of the switches B7 to B9. Further, the switch M4 receives a signal having a destination node number of 2 mod 3, from each of the switches B1 to B3. Further, the switch M7 receives a signal having a destination node number of 3(0) mod 3, from each of the switches B1 to B3.

Further, the switches M1 to M3 and the switches T1 to T3 are combined with each other, the switches M4 to M6 and the switches T4 to T6 are combined with each other, and the switches M7 to M9 and the switches T7 to T9 are combined with each other. Then, the switches M1 to M3 transmit signals having a destination node number of 1 mod 9, to the switch T1 as indicated by an arrow 904, for example. Further, the switches M1 to M3 transmit signals having a destination node number of 4 mod 9, to the switch T2 as indicated by an arrow 905, for example. Further, the switches M1 to M3 transmit signals having a destination node number of 7 mod 9, to the switch T3 as indicated by an arrow 906, for example. Further, the switches M4 to M6 transmit signals having a destination node number of 2 mod 9 to the switch T4, transmit signals having a destination node number of 5 mod 9 to the switch T5, and transmit signals having a destination node number of 8 mod 9 to the switch T6. Further, the switches M7 to M9 transmit signals having a destination node number of 3 mod 9 to the switch T7, transmit signals having a destination node number of 6 mod 9 to the switch T8, and transmit signals having a destination node number of 0 mod 9 (=9 mod 9) to the switch T9.

Then, the switches T1 to T9 transmit signals to the second-stage switches connected to the first-stage switches connected to the nodes having the destination node numbers of the signals received from the switches M1 to M9. Further, the switches M1 to M9 transmit signals to the first-stage switches connected to the nodes having the destination node numbers of the signals received from the switches T1 to T9. Thereafter, the switches B1 to B9 transmit signals to the nodes having the destination node numbers of the signals received from the switches M1 to M9.

In this way, a signal is transmitted from a node to another node in the Fat Tree.

Further, a communication scheme called a shift communication pattern is widely used in all-to-all communication that transmits messages from all nodes to all nodes in Fat Tree connection. If the number of nodes is N, the shift communication pattern is configured by N number of communication phases. Then, in the i-th communication phase, each node transmits a message with respect to a node number that is previous by "i" to its own node number. Thus, if each node number is p (p=1, 2, ..., N), ((i+p) mod N) is a message destination of each node in the i-th communication phase. That is, in the shift communication pattern, the destinations of signals transmitted from the respective nodes do not overlap with each other in each phase.

FIG. 14 is a diagram illustrating a shift communication pattern. FIG. 14 illustrates the 9th communication phase in a case where a shift communication pattern is performed in the same configuration as illustrated in FIG. 13. Numerals enclosed by a box 910 represent the destination node numbers of respective nodes. In the 9th communication phase, the destination node number of each node is equal to 9 plus the node number of each node. In the shift communication pattern, the node numbers of signals received by the first-stage switches B1 to B9 from subordinate nodes are serial numbers. Thus, the first-stage switches receive three signals having destination node numbers of 1 mod 3, 2 mod 3, and 3(0)mod 3. Accordingly, the first-stage switches transmit the received signals to the different second-stage switches. Each of the second-stage switches receives signals that are equal in the remainder of division by 3 among 9 serial destination node numbers. Then, the numbers that are equal in the remainder of division by 3 among 9 serial destination node numbers are different in the remainder of division by 9. For example, the switch M1 receives three signals having destination node numbers of 1 mod 9, 4 mod 9, and 7 mod 9. Accordingly, the switch M1 transmits the received signals to the different third-stage switches. Likewise, each of the switches M2 to M9 transmits the each received signals to the different third-stage switches.

Accordingly, two or more signals may not flow through any path. Hereinafter, when two or more signals flow through the same path, it will be referred to as a path contention. While a description has been given of the 9th communication phase as an example, the relation between the destinations of signals received by each switch is also the same in other communication phases. That is, when the shift communication pattern is used, a path contention does not occur in any communication phase. Accordingly, the use of the shift communication pattern in the Fat Tree can achieve a high throughput in all-to-all communication and can secure a wide band in signal transmission.

In the description of FIGS. 13 and 14, for the convenience in description, it has been described that all signals are transmitted to the destination nodes through the first-stage to third stage switches. However, when the network connection state in each switch is stored and a signal can be transmitted to a destination node even without transmitting the signal to the upper stage, each of the first-stage switches and the second-stage switches directly transmits a signal to the lower-stage switch or a subordinate node. For example, when a node with a node number of 1 transmits a signal to a node with a node number of 2, the first-stage switch directly transmits the signal received from the node with a node number of 1, to the node with a node number of 2.

In the Fat Tree, for example, a second-stage Fat Tree, there has been proposed a conventional technology of the Fat Tree connected to transmit one-hop signals to all other nodes.

Non-patent Literature 1: Using Fat-Trees to Maximize the Number of Processors in a Massively Parallel Computer, M. Valerio, L. E. Moser and P. M. Melliar-Smith, Department of Electrical and Computer Engineering University of California, Santa Barbara However, in the Fat Tree topology illustrated in FIG. 13, when the scale of a network increases, the average number of hops between nodes increases. Therefore, it is difficult to reduce a delay in signal transmission.

Further, in the Fat Tree connected to transmit one-hop signals to all other nodes, it is difficult to perform all-to-all communication by shift communication, and it is difficult to secure a wide band for signal transmission.

SUMMARY

According to an aspect of an embodiment of the invention, a network apparatus, in which one of $n^2$ combinations of signal transmitting/receiving devices classified to have n sequential addresses from the minimum address is connected in one-to-one correspondence with $n^3$ signal transmitting/receiving devices having $n^3$ addresses of serial numbers (n is a natural number equal to or greater than 2), the network apparatus comprising: $n^2$ first signal transmitting units configured to receive n signals, which are different in terms of the remainder of a destination address divided by n, from the signal transmitting/receiving device and transmit the received signals to n different destinations; $n^2$ second signal transmitting units configured to receive n signals, which are equal in terms of the remainder of a destination address divided by n, from the different first signal transmitting units and transmit the received signals to a destination corresponding to the remainder of a destination address of each of the received signals divided by $n^2$; $n^2$ third signal transmitting units configured to have a Fat Tree configuration with respect to the second signal transmitting unit, receive n signals, which are equal in terms of the remainder of a destination address divided by $n^2$, from n different second signal transmitting units, and output the received signal, which is received from the second signal transmitting unit, to the second signal transmitting unit connected to the first signal transmitting unit connected to the signal transmitting/receiving device having a destination address of the received signal; and a bottom connection path disposed between the first signal transmitting units and the second signal transmitting units constituting the Fat Tree together with the third signal transmitting units and configured to interchange a connection point of one or more second signal transmitting units and a connection point of another one or more second signal transmitting units in a Fat Tree configuration between the first signal transmitting units and the second signal transmitting units.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7A is a diagram illustrating the connection between the second-stage switches and the first-stage group according to mutually orthogonal Latin squares;

FIG. 7B is a diagram illustrating the connection between the second-stage switches and the first-stage switches according to orthogonal Latin squares;

DESCRIPTION OF EMBODIMENTS

Preferred embodiments of the present invention will be explained with reference to accompanying drawings.

However, the network apparatus and the network managing apparatus according to the invention are not limited to the embodiments. In particular, while the case of using 6-port switches or 8-port switches will be described as an example, the invention is not limited thereto, and the switches may be as follows. That is, in the first-stage switch, the number of ports connected to nodes is equal to the number of ports connected to the second-stage switches. Further, in the second-stage switch, the number of ports connected to the first-stage switches is equal to the number of ports connected to the third-stage switches. Further, the third-stage switches may have the same number of ports connected to the second-stage switches, as the number of ports of the second-stage switch connected to the third-stage switches.

[a] First Embodiment

Figure 1:
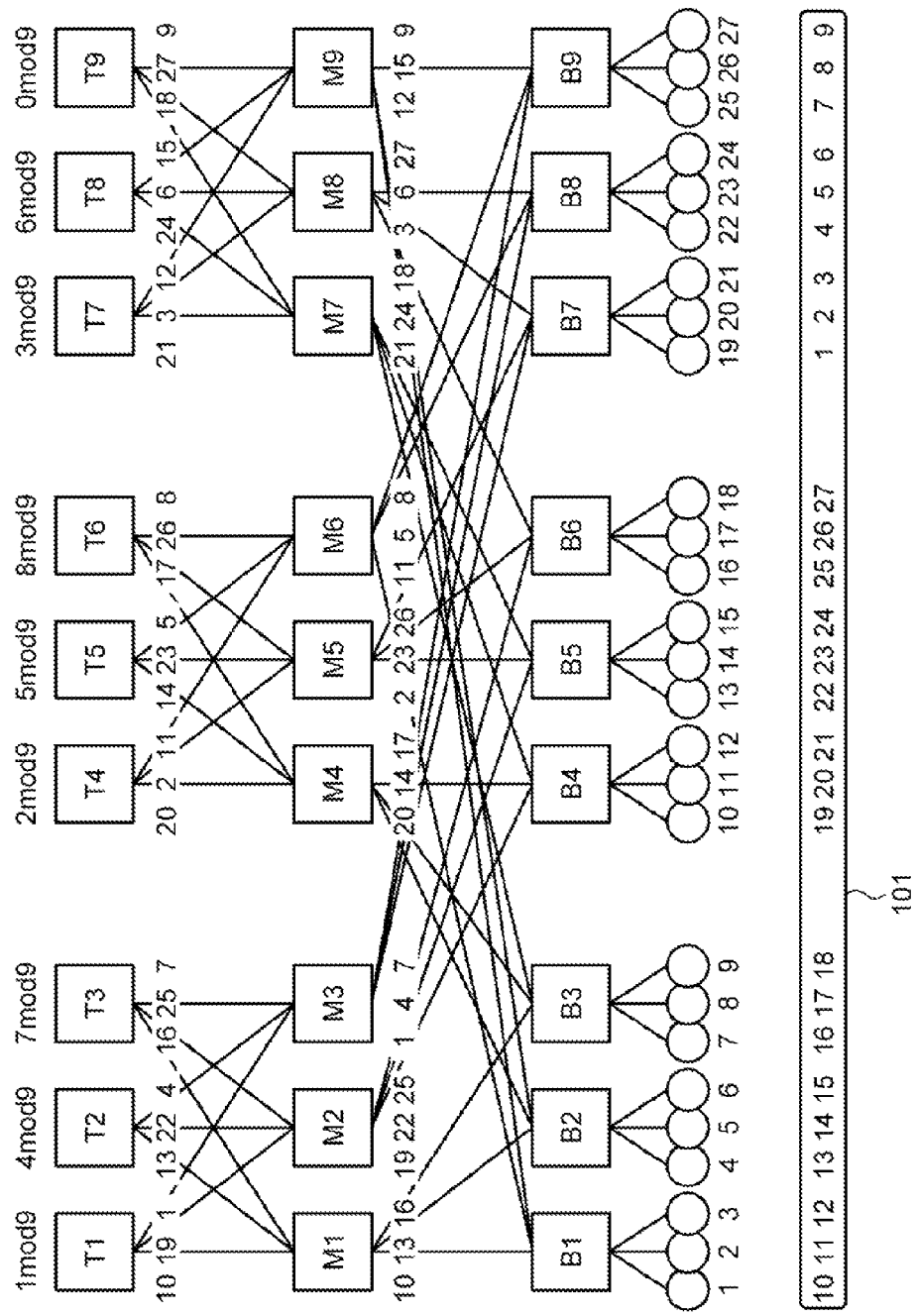
FIG. 1 is a diagram illustrating a configuration of a network apparatus according to a first embodiment.

FIG. 1 is a diagram illustrating a configuration of a network apparatus according to a first embodiment. As illustrated in FIG. 1, the network apparatus according to the first embodiment includes switches B1 to B9, switches M1 to M9, and switches T1 to T9. Herein, the switches B1 to B9 may be referred to collectively as the first-stage switches. Further, the switches M1 to M9 may be referred to collectively as the second-stage switches. Further, the switches T1 to T9 may be referred to collectively as the third-stage switches. Further, a numeral allocated to each of the first-stage switches, the second-stage switches, and the third-stage switches will be referred to as a number of the switch. For example, the switch B1 is the first first-stage switch, and the switch M3 is the third second-stage switch.

Further, three nodes are connected to each of the first-stage switches. That is, as illustrated in FIG. 1, a total of 27 nodes are connected to the network apparatus. Each node is represented by a circle connected to the first-stage switch. A numeral marked under each node is a node number allocated to each node. Hereinafter, the node with a node number P will be referred to as a node P. In this embodiment, the nodes 1 to 3 are connected to the switch B1, the nodes 4 to 6 are connected to the switch B2, and the nodes 7 to 9 are connected to the switch B3. Further, the nodes 10 to 12 are connected to the switch B4, the nodes 13 to 15 are connected to the switch B5, and the nodes 16 to 18 are connected to the switch B6. Further, the nodes 19 to 21 are connected to the switch B7, the nodes 22 to 24 are connected to the switch B8, and the nodes 25 to 27 are connected to the switch B9.

Figure 2:
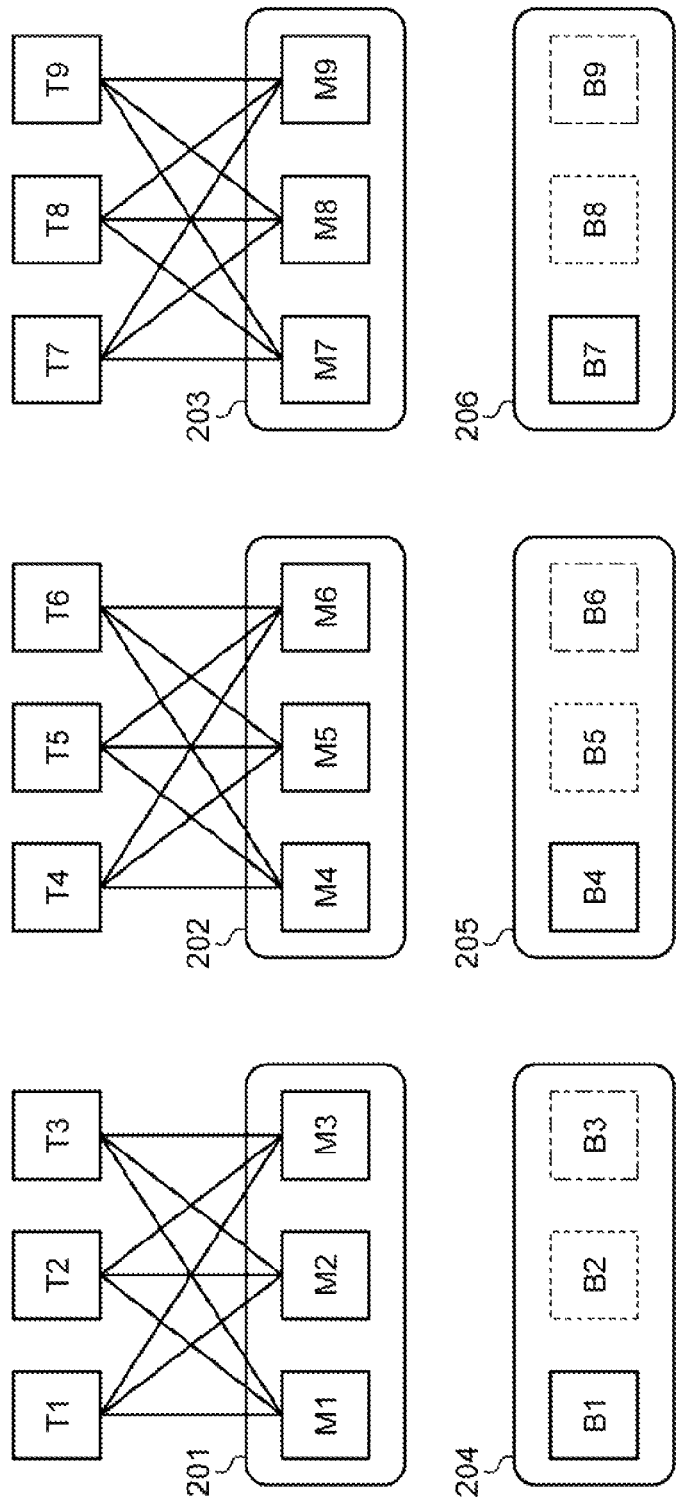
FIG. 2 is a diagram illustrating the preparation of connections between first-stage switches and second-stage switches.

Next, a description will be given of a method of connecting the first-stage switches B1 to B9 and the second-stage switches M1 to M9. FIG. 2 is a diagram illustrating the preparation of connections between the first-stage switches and the second-stage switches.

First, as illustrated in FIG. 2, the first-stage switches B1 to B9 according to this embodiment are classified into three groups. The switches B1 to B9 are classified into groups according to the remainders of the minimum node numbers of the connected nodes divided by 9. That is, the switches B1 to B9 are classified into three groups of the switches B1, B4, and B7, the switches B2, B5, and B8, and the switches B3, B6, and B9. In FIG. 2, the boxes of the switches B1, B4, and B7 are represented by solid lines to indicate that the switches B1, B4, and B7 belong to the same group, which will be referred to as the group 1-1. Further, in FIG. 2, the boxes of the switches B2, B5, and B8 are represented by dotted lines to indicate that the switches B2, B5, and B8 belong to the same group, which will be referred to as the group 1-2. Further, in FIG. 2, the boxes of the switches B3, B6, and B9 are represented by dashed dotted lines to indicate that the switches B3, B6, and B9 belong to the same group, which will be referred to as the group 1-3. This group classification may also be performed according to the remainders of the switch numbers of the first-stage switches divided by 3.

In addition to this group classification, the switches B1 to B9 are classified into the switches B1 to B3 enclosed by a box 204, the switches B4 to B6 enclosed by a box 205, and the switches B7 to B9 enclosed by a box 206.

Further, the second-stage switches M1 to M9 are classified into groups connected to the same third-stage switches. That is, the switches M1 to M9 are classified into three groups of the switches M1 to M3 enclosed by a box 201, the switches M4 to M6 enclosed by a box 202, and the switches M7 to M9 enclosed by a box 203. Herein, the switches M1 to M3 will be referred to as the group 2-1, the switches M4 to M6 will be referred to as the group 2-2, and the switches M7 to M9 will be referred to as the group 2-3.

The connection may be requested to satisfy the following conditions. The first condition is as follows. The switches M1 to M3 included in the group 2-1 receive signals having destination node numbers of 1 mod 9, 4 mod 9, and 7 mod 9, from the first-stage switches. The switches M4 to M6 included in the group 2-2 receive signals having destination node numbers of 2 mod 9, 5 mod 9, and 8 mod 9, from the first-stage switches. The switches M7 to M9 included in the group 2-3 receive signals having destination node numbers of 3 mod 9, 6 mod 9, and 0 mod 9, from the first-stage switches.

Further, the second condition is that all of the switches M1 to M9 receive three signals that are different in terms of the remainder of division by 9.

Figure 13:
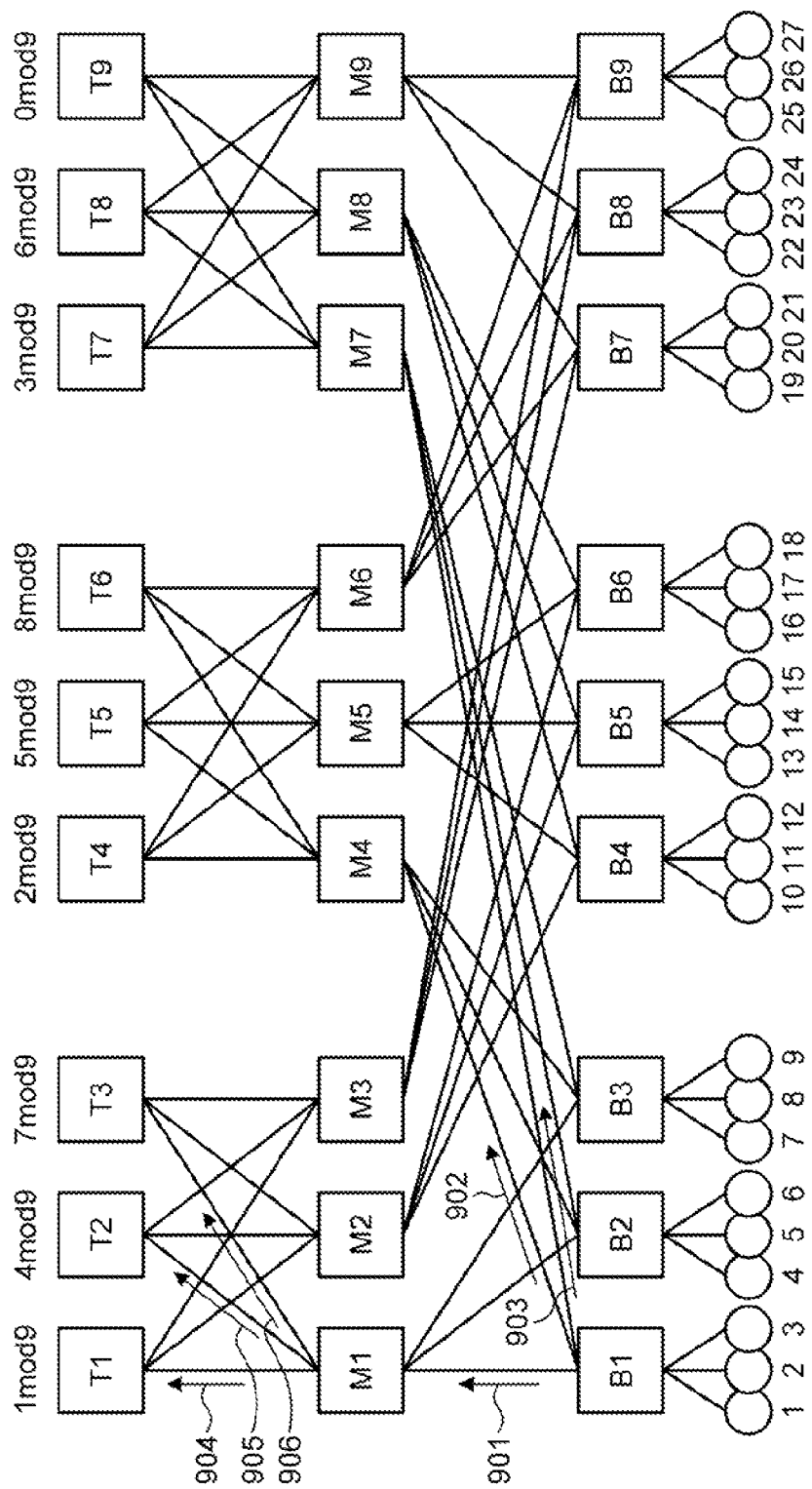
FIG. 13 is a diagram illustrating a configuration of a network apparatus having a three-stage Fat Tree.
Figure 14:
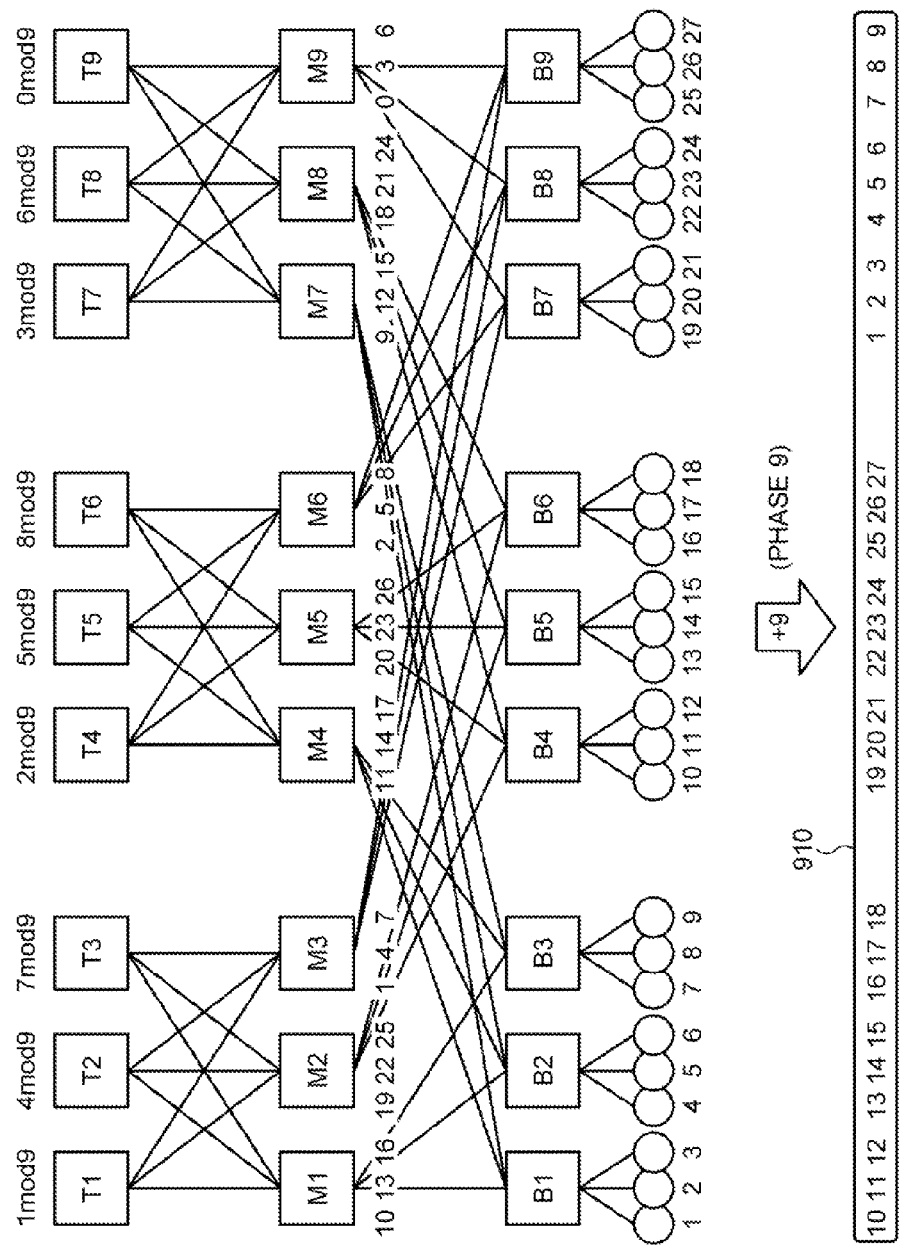
FIG. 14 is a diagram illustrating a shift communication pattern.

Further, the third condition is that the connection between the switches M1 to M9 and the switches B1 to B9 is different from the connection in the conventional Fat Tree illustrated in FIG. 13. That is, the connection between the first-stage switches and any one of the groups 2-1, 2-2, and 2-3 is different from the connection illustrated in FIG. 13.

First, the switches M1 to M3 of the group 2-1 will be described. The switches M1 to M3 can receive only a signal of 1 mod 3 according to the first condition. Since 1 mod 3 is only one in each of the switches B1 to B9, all of the switches B1 to B9 are connected to one of the switches M1 to M3. Further, according to the second condition, the switches M1 to M3 select one first-stage switch from each of the groups 1-1, 1-2, and 1-3. In other words, the switches M1 to M3 may not select a connection point from the same group, among the groups 1-1, 1-2, and 1-3.

Thus, the switch M1 selects one of the switches B1, B4, and B7 of the group 1-1. The switch M2 selects one of the switches other than the switch selected from the switches B1, B4, and B7 of the group 1-1 by the switch M1. Further, the switch M3 selects one of the switches other than the switches selected from the switches B1, B4, and B7 of the group 1-1 by the switches M1 and M2. The switches M1 to M3 receive signals of 1 mod 3 from the selected switches. Herein, in this embodiment, among the outputs of the first-stage switches, a signal of 1 mod 3 is output to the leftmost path toward the paper plane of the drawings. Thus, when the connection is illustrated by the drawings, the leftmost path of the first-stage switches are connected to the switches M1 to M3, thereby satisfying the condition of receiving a signal of 1 mod 3.

Likewise, the switches M1 to M3 select a connection combination of the switches B2, B5, and B7 of the group 1-2. Further, the switches M1 to M3 select a connection combination of the switches B3, B6, and B9 of the group 1-3. Then, the switches M1 to M3 receive signals of 1 mod 3 from the selected switches.

Further, the switches M4 to M6 make a similar switch selection from the groups 1-1 to 1-3. Then, the switches M4 to M6 receive signals of 2 mod 3 from the selected switches. Herein, in this embodiment, among the outputs of the first-stage switches, a signal of 1 mod 3 is output to the central path toward the paper plane of the drawings. Thus, when the connection is illustrated by the drawings, the leftmost path of the first-stage switches are connected to the switches M1 to M3, thereby satisfying the condition of receiving a signal of 2 mod 3.

Further, the switches M7 to M9 make a similar switch selection from the groups 1-1 to 1-3. Then, the switches M7 to M9 receive signals of 0 mod 3 from the selected switches. Herein, in this embodiment, among the outputs of the first-stage switches, a signal of 0 mod 3 is output to the central path toward the paper plane of the drawings. Thus, when the connection is illustrated by the drawings, the leftmost path of the first-stage switches are connected to the switches M1 to M3, thereby satisfying the condition of receiving a signal of 2 mod 3.

However, in order to reduce the average number of hops as compared to the Fat Tree configuration illustrated in FIG. 13, the connection between the first-stage switches and any one of the groups 2-1, 2-2, and 2-3 is different from the connection illustrated in FIG. 13. That is, any one of the groups 2-1, 2-2, and 2-3 is discontinuous in terms of the node numbers of nodes connected to the first-stage switches connected to one of the second-stage switches. The switches B1 to B9 correspond to an example of a "first transmitting unit". Further, the switches M1 to M9 correspond to an example of a "second transmitting unit".

Next, the signal transmission and the connection between the switches B1 to B9 and the switches M1 to M9 according to this embodiment will be described in detail with reference to FIG. 1.

The switch M1 is connected to the switches B1 to B3. Further, the switch M2 is connected to the switches B4 to B6. Further, the switch M3 is connected to the switches B7 to B9. That is, the connection between the first-stage switches and the switches M1 to M3 according to this embodiment are the same as in the case of FIG. 13.

The switch M4 is connected to the switches B2 to B4. Further, the switch M5 is connected to the switches B5 to B7. Further, the switch M6 is connected to the switches B8, B9, and B1. That is, the connection between the first-stage switches and the switches M4 to M6 according to this embodiment corresponds to an increase of a factor of 1 in the number of each of the first-stage switches connected to the M4 to M6 in the case of FIG. 13. However, when the switch number exceeds B9, it returns to B1.

The switch M7 is connected to the switches B3 to B5. Further, the switch M8 is connected to the switches B6 to B8. Further, the switch M9 is connected to the switches B9, B1, and B2. That is, the connection between the first-stage switches and the switches M7 to M9 according to this embodiment corresponds to an increase of a factor of 2 in the number of each of the first-stage switches connected to the M7 to M9 in the case of FIG. 13. However, when the switch number exceeds B9, it returns to B1.

Herein, in this embodiment, the first-stage switches are classified into three groups including three first-stage switches in ascending order of switch number, and the second-stage switches are classified into three groups including three second-stage switches in ascending order of switch number. Then, the first-stage switches grouped as illustrated in FIG. 13 are connected to the same second-stage switch, and the connected first-stage switches are increasingly shifted in number by 1 and connected to each of the grouped second-stage switches. When the switches having a different number of ports are used, the same method may be used to determine the connection. That is, the first-stage switches and the second-stage switches are classified into the group including the half of the number of switch ports. Then, the grouped first-stage switches are connected to the same second-stage switch, and the connected first-stage switches are delayed and connected by increasing the number by a factor of 1 for each of the grouped second-stage switches.

Then, in the network apparatus according to this embodiment, all-to-all communication is performed using a shift communication pattern. Herein, a signal transmission through a signal transmission path in the network apparatus according to this embodiment will be described by exemplifying the case of a phase 9 of the shift communication pattern.

In the phase 9, a signal is transmitted from each node, with respect to a node having a node number marked under each node, as a node number marked in a region enclosed by a box 101. For example, the node 1 transmits a signal to the node 10. Further, the node 2 transmits a signal to the node 11.

The switches B1 to B9 receive a signal transmitted from each of the connected nodes to another node. Then, the switches B1 to B9 transmit a signal having a destination node number of 1 mod 3, to the second-stage switch having the smallest number among the second-stage switches connected thereto. Further, the switches B1 to B9 transmit a signal having a destination node number of 2 mod 3, to the second-stage switch having the second-smallest number among the connected second-stage switches. Further, the switches B1 to B9 transmit a signal having a destination node number of 0 mod 3, to the second-stage switch having the greatest number among the second-stage switches connected thereto. However, when each of the switches B1 to B9 stores a node number of a node connected thereto and the destination node number corresponds to the node connected thereto, it transmits a signal to the corresponding node without transmitting a signal to the second-stage switch. For example, when the switch B1 receives a signal transmitted to the node 2, from the node 1, it transmits the received signal to the node 2 without transmitting a signal to the switch M6.

Herein, the signal transmission from the switches B1 to B9 to the switches M1 to M9 will be described in detail. When the destination node number satisfies 1 mod 3, the switch B1 transmits a signal to the switch M1. When the destination node number satisfies 2 mod 3, the switch B1 transmits a signal to the switch M6. When the destination node number satisfies 0 mod 3, the switch B1 transmits a signal to the switch M9. For example, in the case of the phase 9, the switch B1 receives a signal transmitted from the node 1 to the node 10, receives a signal transmitted from the node 2 to the node 11, and receives a signal transmitted from the node 3 to the node 12. Then, among the received signals, the switch B1 transmits a signal transmitted to the node 10 having a destination node number of 1 mod 3, to the switch M1. Further, among the received signals, the switch B1 transmits a signal transmitted to the node 11 having a destination node number of 2 mod 3, to the switch M6. Further, among the received signals, the switch B1 transmits a signal transmitted to the node 12 having a destination node number of 0 mod 3, to the switch M9.

When the destination node number satisfies 1 mod 3, the switch B2 transmits a signal to the switch M1. When the destination node number satisfies 2 mod 3, the switch B2 transmits a signal to the switch M4. When the destination node number satisfies 0 mod 3, the switch B2 transmits a signal to the switch M9. For example, in the case of the phase 9, the switch B2 receives a signal transmitted from the node 4 to the node 13, receives a signal transmitted from the node 5 to the node 14, and receives a signal transmitted from the node 6 to the node 15. Then, among the received signals, the switch B2 transmits a signal transmitted to the node 13 having a destination node number of 1 mod 3, to the switch M1. Further, among the received signals, the switch B2 transmits a signal transmitted to the node 14 having a destination node number of 2 mod 3, to the switch M4. Further, among the received signals, the switch B2 transmits a signal transmitted to the node 15 having a destination node number of 0 mod 3, to the switch M9.

When the destination node number satisfies 1 mod 3, the switch B3 transmits a signal to the switch M1. When the destination node number satisfies 2 mod 3, the switch B3 transmits a signal to the switch M4. When the destination node number satisfies 0 mod 3, the switch B3 transmits a signal to the switch M7. For example, in the case of the phase 9, the switch B3 receives a signal transmitted from the node 7 to the node 16, receives a signal transmitted from the node 8 to the node 17, and receives a signal transmitted from the node 9 to the node 18. Then, among the received signals, the switch B3 transmits a signal transmitted to the node 16 having a destination node number of 1 mod 3, to the switch M1. Further, among the received signals, the switch B3 transmits a signal transmitted to the node 17 having a destination node number of 2 mod 3, to the switch M4. Further, among the received signals, the switch B3 transmits a signal transmitted to the node 18 having a destination node number of 0 mod 3, to the switch M7.

When the destination node number satisfies 1 mod 3, the switch B4 transmits a signal to the switch M2. When the destination node number satisfies 2 mod 3, the switch B4 transmits a signal to the switch M4. When the destination node number satisfies 0 mod 3, the switch B4 transmits a signal to the switch M7. For example, in the case of the phase 9, the switch B4 receives a signal transmitted from the node 10 to the node 19, receives a signal transmitted from the node 11 to the node 20, and receives a signal transmitted from the node 12 to the node 21. Then, among the received signals, the switch B4 transmits a signal transmitted to the node 19 having a destination node number of 1 mod 3, to the switch M2. Further, among the received signals, the switch B4 transmits a signal transmitted to the node 20 having a destination node number of 2 mod 3, to the switch M4. Further, among the received signals, the switch B4 transmits a signal transmitted to the node 21 having a destination node number of 0 mod 3, to the switch M7.

When the destination node number satisfies 1 mod 3, the switch B5 transmits a signal to the switch M2. When the destination node number satisfies 1 mod 2, the switch B5 transmits a signal to the switch M5. When the destination node number satisfies 0 mod 3, the switch B5 transmits a signal to the switch M7. For example, in the case of the phase 9, the switch B5 receives a signal transmitted from the node 13 to the node 22, receives a signal transmitted from the node 14 to the node 23, and receives a signal transmitted from the node 15 to the node 24. Then, among the received signals, the switch B5 transmits a signal transmitted to the node 21 having a destination node number of 1 mod 3, to the switch M2. Further, among the received signals, the switch B5 transmits a signal transmitted to the node 23 having a destination node number of 2 mod 3, to the switch M5. Further, among the received signals, the switch B5 transmits a signal transmitted to the node 24 having a destination node number of 0 mod 3, to the switch M7.

When the destination node number satisfies 1 mod 3, the switch B6 transmits a signal to the switch M2. When the destination node number satisfies 1 mod 2, the switch B6 transmits a signal to the switch M5. When the destination node number satisfies 0 mod 3, the switch B6 transmits a signal to the switch M8. For example, in the case of the phase 9, the switch B6 receives a signal transmitted from the node 16 to the node 25, receives a signal transmitted from the node 17 to the node 26, and receives a signal transmitted from the node 18 to the node 27. Then, among the received signals, the switch B6 transmits a signal transmitted to the node 24 having a destination node number of 1 mod 3, to the switch M2. Further, among the received signals, the switch B6 transmits a signal transmitted to the node 26 having a destination node number of 2 mod 3, to the switch M5. Further, among the received signals, the switch B6 transmits a signal transmitted to the node 27 having a destination node number of 0 mod 3, to the switch M8.

When the destination node number satisfies 1 mod 3, the switch B7 transmits a signal to the switch M3. When the destination node number satisfies 2 mod 3, the switch B7 transmits a signal to the switch M5. When the destination node number satisfies 0 mod 3, the switch B7 transmits a signal to the switch M8. For example, in the case of the phase 9, the switch B7 receives a signal transmitted from the node 19 to the node 1, receives a signal transmitted from the node 20 to the node 2, and receives a signal transmitted from the node 21 to the node 3. Then, among the received signals, the switch B7 transmits a signal transmitted to the node 1 having a destination node number of 1 mod 3, to the switch M3. Further, among the received signals, the switch B7 transmits a signal transmitted to the node 2 having a destination node number of 2 mod 3, to the switch M5. Further, among the received signals, the switch B7 transmits a signal transmitted to the node 3 having a destination node number of 0 mod 3, to the switch M8.

When the destination node number satisfies 1 mod 3, the switch B8 transmits a signal to the switch M3. When the destination node number satisfies 1 mod 2, the switch B8 transmits a signal to the switch M6. When the destination node number satisfies 0 mod 3, the switch B8 transmits a signal to the switch M8. For example, in the case of the phase 9, the switch B8 receives a signal transmitted from the node 22 to the node 4, receives a signal transmitted from the node 23 to the node 5, and receives a signal transmitted from the node 24 to the node 6. Then, among the received signals, the switch B8 transmits a signal transmitted to the node 4 having a destination node number of 1 mod 3, to the switch M3. Further, among the received signals, the switch B8 transmits a signal transmitted to the node 5 having a destination node number of 2 mod 3, to the switch M6. Further, among the received signals, the switch B8 transmits a signal transmitted to the node 6 having a destination node number of 0 mod 3, to the switch M8.

When the destination node number satisfies 1 mod 3, the switch B9 transmits a signal to the switch M3. When the destination node number satisfies 1 mod 2, the switch B9 transmits a signal to the switch M6. When the destination node number satisfies 0 mod 3, the switch B9 transmits a signal to the switch M9. For example, in the case of the phase 9, the switch B9 receives a signal transmitted from the node 25 to the node 7, receives a signal transmitted from the node 26 to the node 8, and receives a signal transmitted from the node 27 to the node 9. Then, among the received signals, the switch B9 transmits a signal transmitted to the node 7 having a destination node number of 1 mod 3, to the switch M3. Further, among the received signals, the switch B9 transmits a signal transmitted to the node 8 having a destination node number of 2 mod 3, to the switch M6. Further, among the received signals, the switch B9 transmits a signal transmitted to the node 9 having a destination node number of 0 mod 3, to the switch M9.

Herein, the numbers marked under the switches M1 to M9 of FIG. 1 represent the destination node numbers of the signals received from the first-stage switches of the respective switches M1 to M9 in the phase 9. In this way, each of the second-stage switches receives three signals transmitted from the different first-stage switches. That is, if the shift communication pattern is used, when signals are transmitted from the first-stage switches to the second-stage switches, since two or more signals may not flow through the same path, a wide band can be secured in signal transmission.

Further, when each of the switches B1 to B9 receives a signal transmitted from the switches M1 to M9 to the node connected thereto, it transmits the signal to the node having the destination node number. However, each of the switches M1 to M9 stores the number of the node connected to the first-stage switch connected thereto. Then, when the destination node number of the received signal is the number of node connected to the first-stage switch connected thereto, each of the switches M1 to M9 transmits the signal to the first-stage switch connected to the node having the node number.

The number of first-stage switches reaching one hop from the switches B1 to B9 increases as compared to the case of FIG. 13. Hereinafter, when a switch reaches one hop from another switch, the switch may be referred to as an "adjacent connection switch". For example, in FIG. 13, the adjacent connection switches for the switch B1 are only two switches B2 and B3. On the other hand, in FIG. 1, the adjacent connection switches for the switch B1 are four switches B2, B3, B8, and B9. In this manner, the average number of hops in the network apparatus according to this embodiment is smaller than the average number of hops in the conventional configuration illustrated in FIG. 13. Accordingly, a signal transmission delay can be reduced as compared to the configuration illustrated in FIG. 13.

Each of the switches M1 to M3 is connected to all of the switches T1 to T3. Further, each of the switches M4 to M7 is connected to all of the switches T4 to T6. Further, each of the switches M8 and M9 is connected to all of the switches T7 to T9. That is, the second-stage switches and the third-stage switches are connected in the same manner as in the conventional Fat Tree illustrated in FIG. 13.

The switches M1 to M9 receive signals from the switches B1 to B9.

The switches M1 to M3 transmit a signal having a destination node number of 1 mod 9, to the switch T1. Further, the switches M1 to M3 transmit a signal having a destination node number of 4 mod 9, to the switch T2. Further, the switches M1 to M3 transmit a signal having a destination node number of 7 mod 9, to the switch T3.

The switches M4 to M6 transmit a signal having a destination node number of 2 mod 9, to the switch T4. Further, the switches M4 to M6 transmit a signal having a destination node number of 5 mod 9, to the switch T5. Further, the switches M4 to M6 transmit a signal having a destination node number of 8 mod 9, to the switch T6.

The switches M7 to M9 transmit a signal having a destination node number of 3 mod 9, to the switch T7. Further, the switches M7 to M9 transmit a signal having a destination node number of 6 mod 9, to the switch T8. Further, the switches M7 to M9 transmit a signal having a destination node number of 0 mod 9, to the switch T9.

Each of the switches T1 to T9 memorizes the path from it to each node. In the phase 9, the switches T1 to T9 receive signals having a destination node number of 1 mod 9. Then, the switches T1 to T9 specify the second-stage switch connected to the first-stage switch connected to the node having the destination node number of the received signal, and transmit a signal to the specified second-stage switch. The switches T1 to T9 correspond to an example of a "third transmitting unit".

In this manner, when the first-stage to third-stage switches are connected and the shift communication pattern is used to perform communication, a path contention of transmission signals does not occur in each path. Accordingly, a wide band can be secured in signal transmission.

Further, when the first-stage to third-stage switches are connected in this manner, the number of adjacent connection switches for the switches B1 to B9 can be increased as compared to the case of FIG. 13. That is, the network apparatus according to this embodiment can reduce the average number of hops, as compared to the conventional configuration illustrated in FIG. 13. Accordingly, the network apparatus according to this embodiment can reduce a signal transmission delay as compared to the conventional configuration illustrated in FIG. 13.

Next, in this embodiment, the signal transmission from the switches M1 to M9 to the switches T1 to T9 will be described in detail with reference to FIG. 1.

In the phase 9, the switch M1 receives signals transmitted to the nodes 10, 13, and 16. Thus, the switch M1 transmits a signal transmitted to the node 10, to the switch T1, transmits a signal transmitted to the node 13, to the switch T2, and transmits a signal transmitted to the node 16, to the switch T3.

Further, the switch M2 receives signals transmitted to the nodes 19, 22, and 25. Thus, the switch M2 transmits a signal transmitted to the node 19, to the switch T1, transmits a signal transmitted to the node 22, to the switch T2, and transmits a signal transmitted to the node 25, to the switch T3. Further, the switch M3 receives signals transmitted to the nodes 1, 4, and 7. Thus, the switch M3 transmits a signal transmitted to the node 1, to the switch T1, transmits a signal transmitted to the node 4, to the switch T2, and transmits a signal transmitted to the node 7, to the switch T3.

Further, in the phase 9, the switch M4 receives signals transmitted to the nodes 20, 14, and 17. Thus, the switch M4 transmits a signal transmitted to the node 20, to the switch T4, transmits a signal transmitted to the node 14, to the switch T5, and transmits a signal transmitted to the node 17, to the switch T6. Further, the switch M5 receives signals transmitted to the nodes 2, 23, and 26. Thus, the switch M5 transmits a signal transmitted to the node 2, to the switch T4, transmits a signal transmitted to the node 23, to the switch T5, and transmits a signal transmitted to the node 26, to the switch T6. Further, the switch M6 receives signals transmitted to the nodes 11, 5, and 8. Thus, the switch M6 transmits a signal transmitted to the node 11, to the switch T4, transmits a signal transmitted to the node 5, to the switch T5, and transmits a signal transmitted to the node 8, to the switch T6.

Further, in the phase 9, the switch M7 receives signals transmitted to the nodes 21, 24, and 18. Thus, the switch M7 transmits a signal transmitted to the node 21, to the switch T7, transmits a signal transmitted to the node 24, to the switch T8, and transmits a signal transmitted to the node 18, to the switch T9. Further, the switch M8 receives signals transmitted to the nodes 3, 6, and 27. Thus, the switch M8 transmits a signal transmitted to the node 3, to the switch T7, transmits a signal transmitted to the node 6, to the switch T8, and transmits a signal transmitted to the node 27, to the switch T9. Further, the switch M9 receives signals transmitted to the nodes 12, 15, and 9. Thus, the switch M9 transmits a signal transmitted to the node 12, to the switch T7, transmits a signal transmitted to the node 15, to the switch T8, and transmits a signal transmitted to the node 9, to the switch T9.

Herein, the numbers marked under the switches T1 to T9 of FIG. 1 represent the destination node numbers of the signals received from the second-stage switches in the phase 9. Further, the MOD functions marked on top of the switches T1 to T9 represent the condition satisfied by the destination of the signals received by the second-stage switches of the switches T1 to T9 in the phase 9. In this way, each of the third-stage switches receives three signals transmitted from the different second-stage switches. That is, if the shift communication pattern is used, when signals are transmitted from the second-stage switches to the third-stage switches, since two or more signals may not flow through the same path, a wide band can be secured in signal transmission.

The case of the phase 9 of the shift communication pattern has been described above. However, also in other phases, two or more signals are not transmitted through the same path. Accordingly, the network apparatus according to this embodiment can secure a wide band in signal transmission when communication is performed using the shift communication pattern.

Second Embodiment

Figure 3:
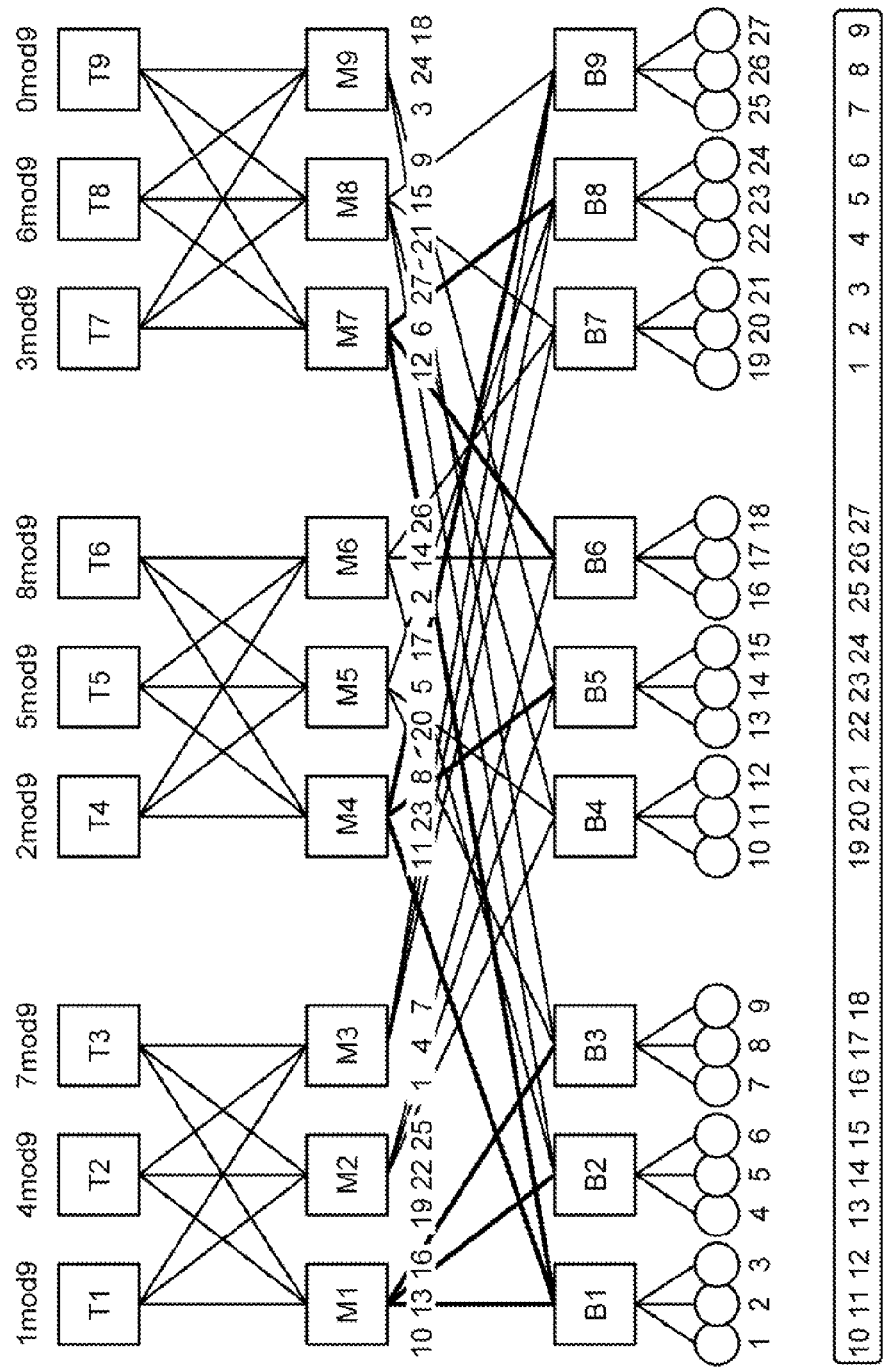
FIG. 3 is a diagram illustrating a configuration of a network apparatus according to a second embodiment.

FIG. 3 is a diagram illustrating a configuration of a network apparatus according to a second embodiment. The second embodiment is different from the first embodiment in terms of the connection between the first-stage switches and the second-stage switches in the network apparatus. Thus, the following description will be made on the connection between the first-stage switches and the second-stage switches. In particular, the connection and the signal flow after the second-stage switches are identical to those of the first embodiment, and thus the redundant description will not be repeated.

Thus, a description will be given of a method of connecting the first-stage switches and the second-stage switches in the network apparatus according to the second embodiment.

In addition to the above group classification, the first-stage switches are selected and classified on a three-by-three basis in ascending order of number as illustrated in FIG. 2. That is, the switches B1 to B9 are classified into the switches B1 to B3 enclosed by a solid line 204, the switches B4 to B6 enclosed by a dotted line 205, and the switches B7 to B9 enclosed by a dashed dotted line 206. Then, the group enclosed by the solid line 204 will be referred to as the group A, the group enclosed by the dotted line 205 will be referred to as the group B, and the group enclosed by the dashed dotted line 206 will be referred to as the group C. Further, the groups 1-1 to 1-3 will be referred to collectively as "other groups". Further, the groups A to C will be referred to collectively as the "first-stage group". Further, the group B is next to the group A, the group C is next to the group B, and the group A is next to the group C.

First, the switches M1 to M3 are connected in the same way as in the Fat Tree configuration illustrated in FIG. 13. That is, the switch M1 is connected to the switches B1, B2, and B3. The switch M2 is connected to the switches B4, B5, and B6. Further, the switch M3 is connected to the switches B7, B8, and B9.

Thereafter, the switch M4 selects the switch B1 corresponding to the group 1-1 of the group A. Further, the switch M4 selects the switch B5 corresponding to the group 1-2 from the group B next to the group A. Further, the switch M4 selects the switch B9 corresponding to the group 1-3 from the group C next to the group B.

Then, the switch M5 selects the switch included in the other group identical to that selected by the switch M4, from the first-stage group next to the first-stage group from which the switch M4 selects the switch included in each of the other groups. Further, the switch M6 selects the switch included in the other group identical to that selected by the switch M5, from the group next to the first-stage group from which the switch M5 selects the switch included in each of the other groups.

Thereafter, the switch M7 selects the switch B1 corresponding to the group 1-1 of the group A. Further, the switch M7 selects the switch B8 corresponding to the group 1-2 from the group C that is second-next to the group A. Further, the switch M7 selects the switch B6 corresponding to the group 1-3 from the group B that is second-next to the group C.

Then, the switch M8 selects the switch included in the other group identical to that selected by the switch M4, from the first-stage group next to the first-stage group from which the switch M7 selects the switch included in each of the other groups. Further, the switch M9 selects the switch included in the other group identical to that selected by the switch M5, from the group next to the first-stage group from which the switch M8 selects the switch included in each of the other groups.

When the connection points are selected as above, the connection state illustrated in FIG. 3 is obtained. Thus, a description will be given of the communication in the phase 9 in the case where the shift communication pattern is used to perform all-to-all communication in the connection state of FIG. 3.

The switch B1 transmits the signal received from the node 1 and transmitted to the node 10, to the switch M1, because the destination node number is 1 mod 3. Further, the switch B1 transmits the signal received from the node 2 and transmitted to the node 11, to the switch M4, because the destination node number is 2 mod 3. Further, the switch B1 transmits the signal received from the node 3 and transmitted to the node 12, to the switch M7, because the destination node number is 0 mod 3.

The switch B2 transmits the signal received from the node 4 and transmitted to the node 13, to the switch M1, because the destination node number is 1 mod 3. Further, the switch B2 transmits the signal received from the node 5 and transmitted to the node 14, to the switch M4, because the destination node number is 2 mod 3. Further, the switch B2 transmits the signal received from the node 6 and transmitted to the node 15, to the switch M8, because the destination node number is 0 mod 3.

The switch B3 transmits the signal received from the node 7 and transmitted to the node 16, to the switch M1, because the destination node number is 1 mod 3. Further, the switch B3 transmits the signal received from the node 8 and transmitted to the node 17, to the switch M5, because the destination node number is 2 mod 3. Further, the switch B3 transmits the signal received from the node 9 and transmitted to the node 18, to the switch M9, because the destination node number is 0 mod 3.

The switch B4 transmits the signal received from the node 10 and transmitted to the node 19, to the switch M2, because the destination node number is 1 mod 3. Further, the switch B4 transmits the signal received from the node 11 and transmitted to the node 20, to the switch M5, because the destination node number is 2 mod 3. Further, the switch B4 transmits the signal received from the node 12 and transmitted to the node 21, to the switch M8, because the destination node number is 0 mod 3.

The switch B5 transmits the signal received from the node 13 and transmitted to the node 22, to the switch M2, because the destination node number is 1 mod 3. Further, the switch B5 transmits the signal received from the node 14 and transmitted to the node 23, to the switch M4, because the destination node number is 2 mod 3. Further, the switch B5 transmits the signal received from the node 15 and transmitted to the node 24, to the switch M9, because the destination node number is 0 mod 3.

The switch B6 transmits the signal received from the node 16 and transmitted to the node 25, to the switch M2, because the destination node number is 1 mod 3. Further, the switch B6 transmits the signal received from the node 17 and transmitted to the node 26, to the switch M6, because the destination node number is 2 mod 3. Further, the switch B6 transmits the signal received from the node 18 and transmitted to the node 27, to the switch M7, because the destination node number is 0 mod 3.

The switch B7 transmits the signal received from the node 19 and transmitted to the node 1, to the switch M3, because the destination node number is 1 mod 3. Also, the switch B7 transmits the signal received from the node 20 and transmitted to the node 2, to the switch M6, because the destination node number is 2 mod 3. Also, the switch B7 transmits the signal received from the node 21 and transmitted to the node 3, to the switch M8, because the destination node number is 0 mod 3.

The switch B8 transmits the signal received from the node 22 and transmitted to the node 4, to the switch M3, because the destination node number is 1 mod 3. Further, the switch B8 transmits the signal received from the node 23 and transmitted to the node 5, to the switch M5, because the destination node number is 2 mod 3. Further, the switch B8 transmits the signal received from the node 24 and transmitted to the node 6, to the switch M7, because the destination node number is 0 mod 3.

The switch B9 transmits the signal received from the node 25 and transmitted to the node 7, to the switch M3, because the destination node number is 1 mod 3. Further, the switch B9 transmits the signal received from the node 26 and transmitted to the node 8, to the switch M4, because the destination node number is 2 mod 3. Further, the switch B9 transmits the signal received from the node 27 and transmitted to the node 9, to the switch M8, because the destination node number is 0 mod 3.

Further, each of the switches B1 to B9 stores the number of the node connected thereto. When receiving the signal transmitted from the switches M1 to M9 to the node connected thereto, each of the switches B1 to B9 transmits the signal to the node having the destination node number. Further, each of the switches M1 to M9 stores the number of the node connected to the first-stage switch connected thereto. When the destination node number of the received signal is the number of the node connected to the first-stage switch connected thereto, each of the switches M1 to M9 transmits the signal to the first-stage switch connected to the node having the node number.

Herein, the numbers marked under the switches M1 to M9 of FIG. 3 represent the destination node numbers of the signals received from the first-stage switches of the respective switches M1 to M9 in the phase 9. As illustrated in FIG. 3, each of the second-stage switches receives three signals transmitted from the different first-stage switches. That is, if the shift communication pattern is used, when signals are transmitted from the first-stage switches to the second-stage switches, since two or more signals may not flow through the same path, a wide band can be secured in signal transmission.

Further, the destination of the received signal of each of the switches M1 to M9 is the node number transmitted to the different third-stage switches. Thus, if the shift communication pattern is used, when signals are transmitted from the second-stage switches to the third-stage switches, since two or more signals may not flow through the same path, a wide band can be secured in signal transmission.

Further, the number of adjacent connection switches for the switches B1 to B9 is increased, as compared to the case of FIG. 13. For example, in FIG. 13, the adjacent connection switches for the switch B1 are only two switches B2 and B3. On the other hand, in FIG. 3, the adjacent connection switches for the switch B1 are six switches B2, B3, B5, B6, B8 and B9. In this manner, the network apparatus according to this embodiment reduces the average number of hops, as compared to the conventional configuration illustrated in FIG. 13.

Further, while all of $n^3$ nodes are provided in this configuration example, the first-stage switch and some nodes frequently used in the conventional Fat Tree configuration may be removed. For example, in the conventional Fat Tree, a path contention can be avoided even when the switch B8 or B9 and the subordinate node thereof are removed from the configuration of FIG. 13.

Further, when the subordinate nodes 20 and 21 of the switch B7 are removed from the configuration, some path contention occurs in all-to-all communication. However, the degree of the path contention is about the same as in the conventional Fat Tree configuration, and it is practically no problem.

(Modification)

Figure 4:
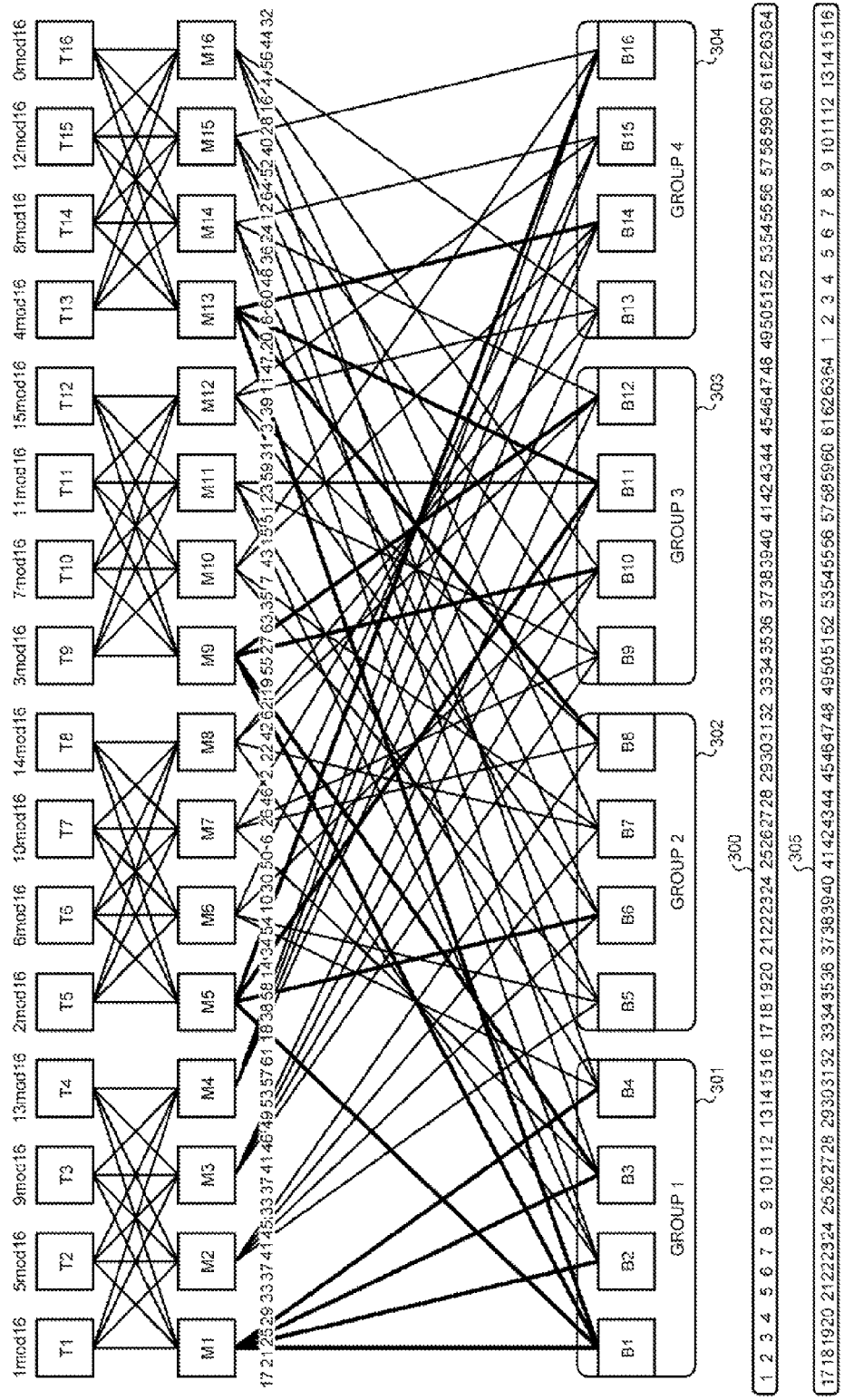
FIG. 4 is a diagram illustrating a configuration of a network apparatus according to a modification of a second embodiment.

FIG. 4 is a configuration diagram of a network apparatus according to a modification of the second embodiment. The case of using 8-port switches will now be described as the modification of the second embodiment. The network apparatus according to the modification includes 16 switches B1 to B16 as the first-stage switches, 16 switches M1 to M16 as the second-stage switches, and 16 switches T1 to T16 as the third-stage switches.

Further, provided are 64 nodes allocated node numbers of 1 to 64. Numerals marked in a region enclosed by a solid line 300 represent the numbers of nodes connected to the corresponding first-stage switches. In particular, nodes 4(i−1)+1 to 4i are connected to the switch Bi (i=1, 2, . . . , 16).

Herein, the switches B1 to B16 are selected on a four-by-four basis in ascending order of number and are classified into four groups. The group of switches B1 to B4 is the group 301, the group of switches B5 to B8 is the group 302, the group of switches B9 to B12 is the group 303, and the group of switches B13 to B16 is the group 304. The groups 301 to 304 will be referred to collectively as the "first-stage group".

The switch M1 selects four switches from the group 301. Then, the switch M2 selects the switch included in the other group identical to that selected by the switch M1, from the first-stage group next to the first-stage group from which the switch M1 selects the switch included in each of the other groups. Further, the switch M3 selects the switch included in the other group identical to that selected by the switch M2, from the group next to the first-stage group from which the switch M2 selects the switch included in each of the other groups. Further, the switch M4 selects the switch included in the other group identical to that selected by the switch M3, from the first-stage group next to the first-stage group from which the switch M3 selects the switch included in each of the other groups.

Thereafter, the switch M5 sequentially selects the next group sequentially from the group 301, and selects the first-stage switches having switch numbers of 1 mod 4, 2 mod 4, 3 mod 4, and 0 mod 4, corresponding to the order of the sequentially-selected groups. In this case, the switch M5 selects the groups in the order of groups 301, 302, 303, and 304. Then, the switches M6 to M8 select the first-stage switches, like the switches M2 to M4 with respect to the switch M1.

Thereafter, the switch M9 sequentially selects the second-next group sequentially from the group 301, and selects the first-stage switches having switch numbers of 1 mod 4, 2 mod 4, 3 mod 4, and 0 mod 4, corresponding to the order of the sequentially-selected groups. In this case, the switch M9 selects the groups in the order of groups 301, 303, 301, and 303. Then, the switches M10 to M12 select the first-stage switches, like the switches M2 to M4 with respect to the switch M1.

Thereafter, the switch M13 sequentially selects the third-next group sequentially from the group 301, and selects the first-stage switches having switch numbers of 1 mod 4, 2 mod 4, 3 mod 4, and 0 mod 4, corresponding to the order of the sequentially-selected groups. In this case, the switch M13 selects the groups in the order of groups 301, 304, 303, and 302. Then, the switches M14 to M16 select the first-stage switches, like the switches M2 to M4 with respect to the switch M1.

When the switches B1 to M16 connected to the switches M1 to M16 are selected, the connection between the switches M1 to M16 and the switches B1 to B16 is identical to the connection illustrated in FIG. 4.

A description will now be given of a signal flow in the phase 9 in the case where all-to-all communication is performed by the shift communication pattern when the connection is made as illustrated in FIG. 4. In the phase 9, the node number of a signal transmitted by each node is the number corresponding to each node marked in a region enclosed by a solid line 305.

When a signal is transmitted from each node with respect to the node number enclosed by the solid line 305, the switches M1 to M16 receive signals having destination node numbers corresponding to numbers marked thereunder. These numbers are different, and a signal path contention does not occur in the path connecting the switches M1 to M16 and the switches B1 to B16. Accordingly, a wide band can be secured in signal transmission between the first-stage switches and the second-stage switches.

Signals having destination node numbers corresponding to numbers marked under the switches M1 to M16 are transmitted to the different third-stage switches connected respectively to the switches M1 to M16. Therefore, a signal path contention does not occur in the path connecting the switches M1 to M16 and the switches T1 to T16. Accordingly, a wide band can be secured in signal transmission between the second-stage switches and the third-stage switches.

Further, the number of adjacent connection switches for the switches B1 to B9 is increased as compared to the case of using the conventional Fat Tree configuration. In the conventional Fat Tree configuration, the adjacent connection switches for the switch B1 are only switches B2 to B6. On the other hand, in FIG. 4, for example, the adjacent connection switches for the switch B1 include not only the switches B2 to B6 but also the switches B6, B8, B10 to B12, and B14 to B16. In this way, the network apparatus according to this embodiment reduces the average number of hops, as compared to the conventional configuration illustrated in FIG. 13.

As described above, in this embodiment, for the connection, the number of the first-stage groups, from which the first-stage switches connected to the second-stage switch of each of the second-stage groups are selected, is sequentially increased like 'first-next' and 'second-next'. In the three-stage network apparatus using 2n-port switches, if n is a prime number, the same connection method as described in this embodiment may be used to maximize the number (n(n−1)) of adjacent connection switches for each of the first-stage switches. In the connection method described in this embodiment, if n is not a prime number, when the first-stage switch is selected, some of the common first-stage switches are selected from the second-stage switches connected to the selected switch.

Third Embodiment

Figure 5:
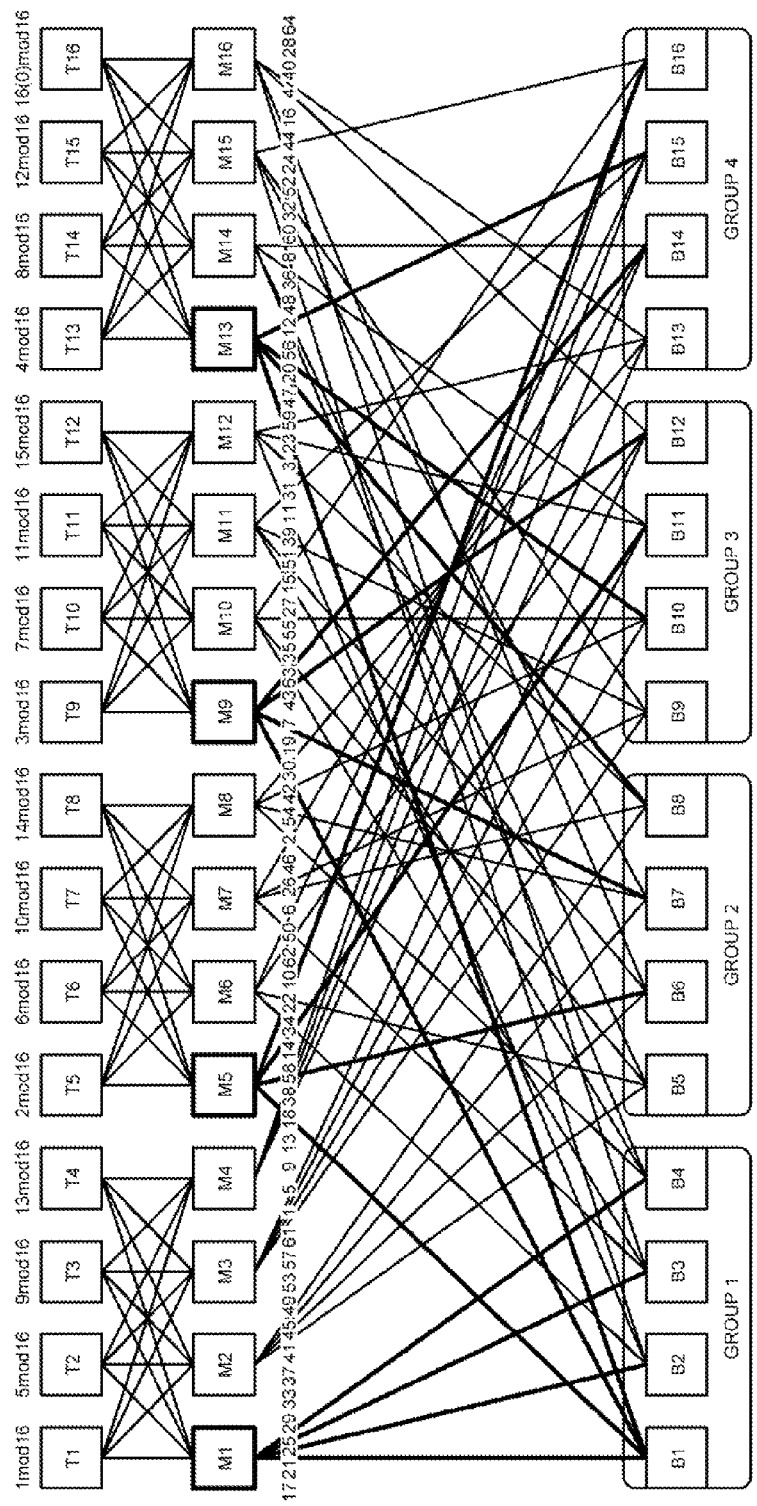
FIG. 5 is a diagram illustrating a configuration of a network apparatus according to a third embodiment.

A network apparatus according to a third embodiment will be described below. FIG. 5 is a configuration diagram of a network apparatus according to the third embodiment. The network apparatus according to this embodiment uses a different method from the second embodiment, thereby maximizing the number of adjacent connection switches for the first-stage switches when n is not a prime number. Thus, a description will now be given of a connection method that maximizes the number of adjacent connection switches for the first-stage switches when n is not a prime number.

A description will now be given of a method that maximizes the number of adjacent connection switches for the first-stage switches in the case of a three-stage network apparatus using 8-port switches in the modification according to the first embodiment.

Figure 6A:
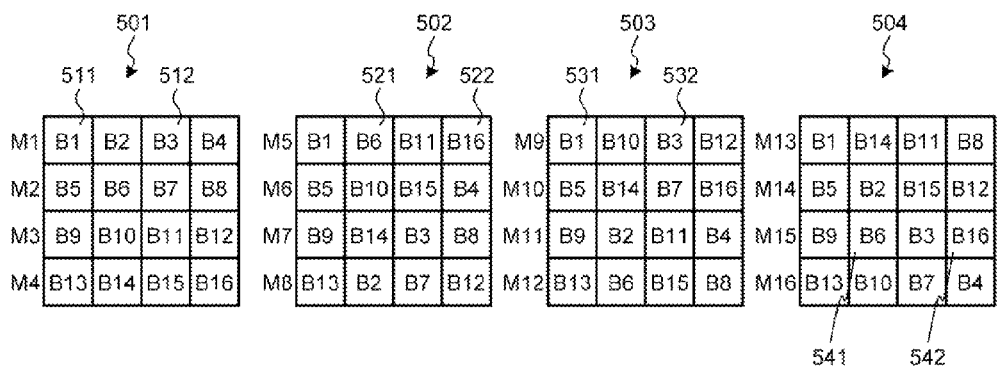
FIG. 6A is a diagram illustrating the connection between the second-stage switches and the first-stage switches in the connections of FIG. 4.

FIG. 6A is a diagram illustrating the connection relation between the second-stage switches and the first-stage switches in the connections of FIG. 4. The squares 501 to 504 of FIG. 6A indicate that the second-stage switches having numbers marked to the left toward the paper plane of squares and the first-stage switches having numbers arranged in a row have a connection relation. For example, B1 to B4 arranged in the M1 row of the square 501 indicate that the switches B1 to B4 and the switch M1 have a connection relation. Further, the column of each square indicates that the switches have node numbers of 1 mod 4, 2 mod 4, 3 mod 4, and 0 mod 5 sequentially from the left toward the paper plane.

Figure 6B:
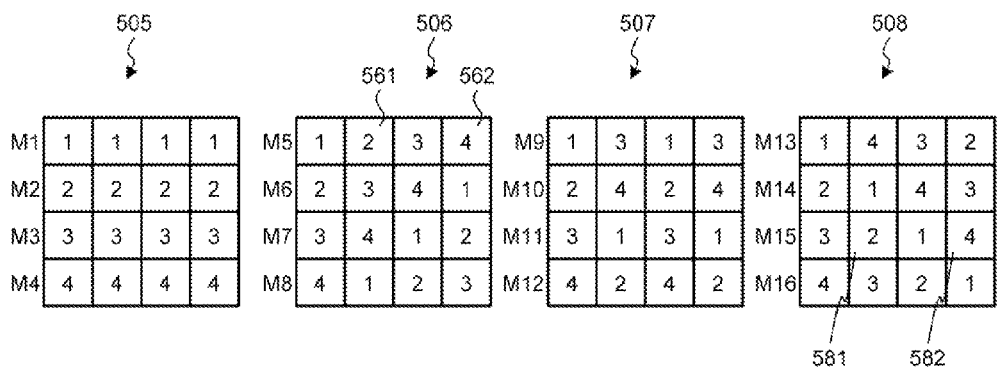
FIG. 6B is a diagram illustrating the connection between the second-stage switches and the first-stage group in the connections of FIG. 4.

FIG. 6B is a diagram illustrating the connection relation between the second-stage switches and the first-stage group in the connections of FIG. 4. FIG. 6B illustrates changing the first-stage switches of FIG. 4 into the last numeral of the number of the first-stage group to which the first-stage switches belong to.

In FIG. 6A, it can be seen that the switches B1 and B3 are connected to the switch M1 in lattices 511 and 512. Further, it can be seen that the switches B1 and B3 are connected to the switch M9 in lattices 531 and 532. That is, the switches B1 and B3 have two paths connected to the common second-stage switches. When this overlap is eliminated, the number of adjacent connection switches is further increased. Thus, B3 may not appear in the row of M9 in order to eliminate an overlap between the lattices 511 and 512 and the lattices 531 and 532. Thus, an aligned Latin square may be constructed such that a square 503 is not identical in both of the horizontal direction and the vertical direction.

A description will now be given of the elimination of an overlap between the lattices 521 and 522 and the lattices 541 and 542 in the squares 502 and 504. In FIG. 6B, a square 506 and a square 508 are together a Latin square. However, an overlap occurs between the lattices 561 and 562 and the lattices 581 and 582. Thus, each of the squares 505 to 508 is mutually-orthogonal Latin square (hereinafter referred to as "mutually-orthogonal Latin square"), thereby eliminating the overlap.

In the mutually-orthogonal Latin square, for example, if the length of one side is n, when n is the power of a prime number, n-1 mutually-orthogonal Latin squares are present and each of them can be calculated. This calculation may be performed by a known mutually-orthogonal Latin square derivation method.

Thus, the length of one side of each square of FIG. 6B is 4, which is the square of a prime number of 2. Thus, a known mutually-orthogonal Latin square derivation method may be used to calculate a mutually-orthogonal Latin square for each square of FIG. 6B. FIG. 7A is a diagram illustrating the connection between the second-stage switches and the first-stage group according to mutually orthogonal Latin squares. Each of the squares 601 to 604 is the conversion of each of the squares 505 to 508 of FIG. 6B into a mutually orthogonal Latin square. Each of the squares 601 to 604 is a mutually orthogonal Latin square.

Next, switches, which are included in the first-stage group of the last number corresponding to the squares 601 to 604 and respectively have node numbers of 1 mod 4, 2 mod 4, 3 mod 4, and 0 mod 5 sequentially from the left toward the paper plane of each square, are allocated to generate the squares 605 to 608 illustrated in FIG. 7B. FIG. 7B is a diagram illustrating the connection between the second-stage switches and the first-stage switches according to orthogonal Latin squares. That is, the second-stage switches and the first-stage switches may be connected to form the connection illustrated in FIG. 7B, thus generating a network apparatus maximizing the number of adjacent connection switches. When the second-stage switches and the first-stage switches are connected to form the connection illustrated in FIG. 7B, it is possible to generate a network apparatus having the connection illustrated in FIG. 5.

In the network apparatus illustrated in FIG. 5, the number of adjacent connection switches becomes 12 with respect to any of the first-stage switches, and it is maximized.

As described above, in the network apparatus according to this embodiment, when the first-stage switches, which are connected vertically to the respective second-stage switches in each of the second-stage groups, are arranged in a row and squares, in which the remainders of columns divided by 4 are 1, 2, 3, and 0, are generated, each of the squares becomes a mutually-orthogonal Latin square. Accordingly, the number of adjacent connection switches for the first-stage switches can be maximized, and the average number of hops can be minimized.

Figure 8:
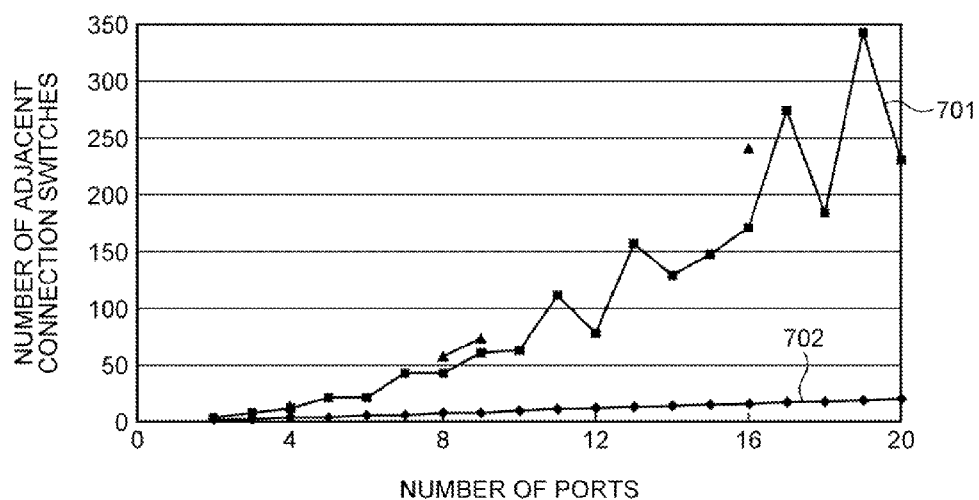
FIG. 8 is a diagram illustrating the number of adjacent connection switches corresponding to the number of switch ports.

A description will now be given of the number of adjacent connection switches in the case where the connection is made by the connection method of the second and third embodiments when the number of switch ports used is changed. FIG. 8 is a diagram illustrating the number of adjacent connection switches corresponding to the number of switch ports. Further, FIG. 9 is a diagram illustrating the ratio of adjacent connection switches corresponding to the number of switch ports.

In FIG. 8, the vertical axis represents the number of adjacent connection switches, and the horizontal axis represents the number of switch ports. A graph 701 of FIG. 8 represents a change in the number of adjacent connection switches in the case where the connection method of the second embodiment is used. Further, a triangular dot represents the number of adjacent connection switches in the case where the connection method of the third embodiment is used to change the connection method of the second embodiment. Further, a graph 702 represents a change in the number of adjacent connection switches in the case where the conventional Fat Tree connection method is used.

Figure 9:
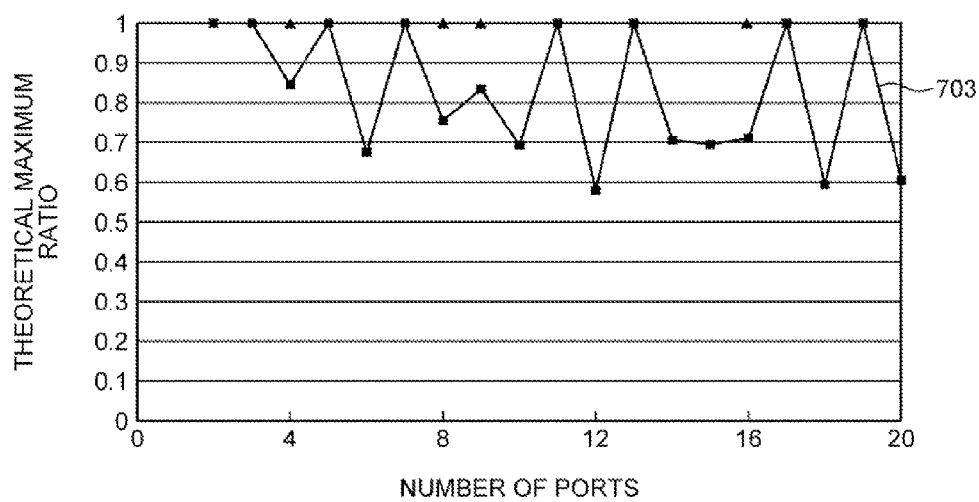
FIG. 9 is a diagram illustrating the ratio of adjacent connection switches corresponding to the number of switch ports.

In FIG. 9, the vertical axis represents the theoretical maximum ratio of adjacent connection switches to all of the other switches, and the horizontal axis represents the number of switch ports. A graph 703 of FIG. 9 represents a change in the ratio of adjacent connection switches in the case where the connection method of the second embodiment is used. Further, a triangular dot represents the ratio of adjacent connection switches in the case where connection method of the third embodiment is used to change the connection method of the second embodiment.

It can be seen from the graph 702 of FIG. 8 that the conventional connection method suppresses an increase in the number of adjacent connection switches even when the number of switch ports is increased. On the other hand, it can be seen from the graph 701 that the connection method of the second embodiment greatly increases the number of adjacent connection switches with an increase in the number of switch ports. Further, according to the conventional connection method, the ratio of adjacent connection switches is reduced because the ratio of an increase in the number of adjacent connection switches to an increase in the number of switch ports is low. On the other hand, as represented by the graph 703, the ratio of adjacent connection switches in several ports can be increased by the connection method of the second embodiment. That is, the connection method of the second embodiment can greatly reduce the average number of hops, as compared to the conventional connection method.

Further, as represented by the triangular dots of FIG. 8, when the number of ports is the power of a prime number, the connection method of the third embodiment can increase and maximize the number of adjacent connection switches, as compared to the case of the second embodiment. Further, as represented by the triangular dots of FIG. 9, when the number of ports is the power of a prime number, the connection method of the third embodiment can increase the ratio of adjacent connection switches to the theoretical maximum value.

Fourth Embodiment

Figure 10:
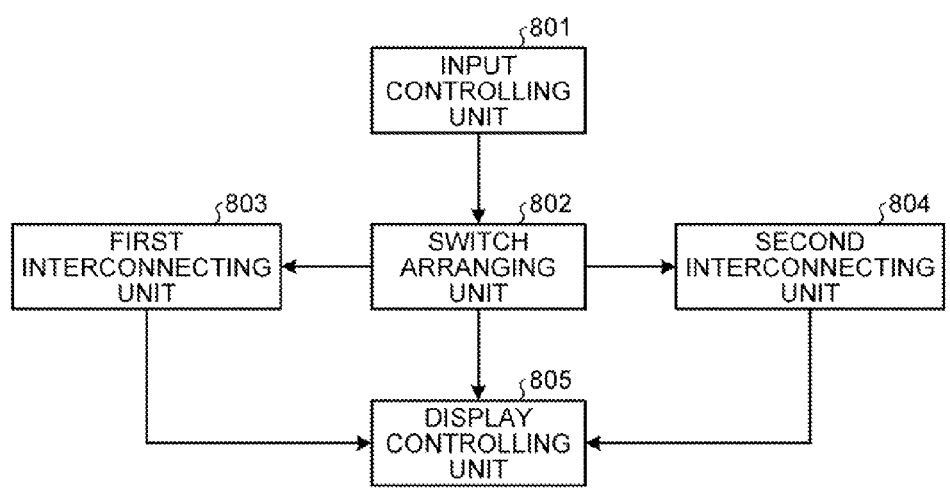
FIG. 10 is a block diagram illustrating a network managing apparatus according to a fourth embodiment.

A network managing apparatus according to a fourth embodiment will be described below. FIG. 10 is a block diagram of a network managing apparatus according to the fourth embodiment. The network managing apparatus according to the fourth embodiment is an apparatus that obtains the connections between first-stage to third-stage switches using one of the first to third embodiments and presents the obtained connection states to an operator. The case of obtaining the connections using the method of the first embodiment will be described below.

An input controlling unit 801 receives the number of switch ports that is input using a keyboard by an operator. For example, when 6-port switches are used, the input controlling unit 801 receives 6 as the number of ports. Herein, the input controlling unit 801 outputs the received number of ports to a switch arranging unit 802.

The switch arranging unit 802 calculates the number of first-stage to third-stage switches, respectively, by squaring the half of the received number of ports. For example, in the case of 6-port switches, the switch arranging unit 802 includes first-stage to third-stage switches, each of which is provided with 9 switches. The switch arranging unit 802 notifies a display controlling unit 805 such that the first-stage switches are arranged in parallel at the very bottom of a screen. Thereafter, the switch arranging unit 802 notifies the display controlling unit 805 such that the second-stage switches are arranged in parallel above the first-stage switches on the screen. Further, the switch arranging unit 802 notifies the display controlling unit 805 such that the third-stage switches are arranged in parallel above the second-stage switches on the screen.

Further, the switch arranging unit 802 waves the numbers of B1, B2, . . . , from left to right toward the screen with respect to the first-stage switches arranged in the screen. Further, the switch arranging unit 802 waves the numbers of M1, M2, . . . , from left to right toward the screen with respect to the second-stage switches arranged in the screen. Further, the switch arranging unit 802 waves the numbers of T1, T2, . . . , from left to right toward the screen with respect to the third-stage switches arranged in the screen.

Thereafter, the switch arranging unit 802 outputs the number of switch ports and each switch number to a first interconnecting unit 803 and a second interconnecting unit 804.

The first interconnecting unit 803 receives the number of switch ports and each switch number from the switch arranging unit 802.

The first interconnecting unit 803 classifies the second-stage switches into groups in ascending order of number corresponding to the half of the number of ports. Further, the first interconnecting unit 803 classifies the third-stage switches into groups in ascending order of number corresponding to the half of the number of ports.

The first interconnecting unit 803 obtains the connections that connect the switches included in each group of the second-stage switches to all switches included in the group of the third-stage switches located on a position corresponding to the screen. Thereafter, the first interconnecting unit 803 outputs the obtained connections to the display controlling unit 805.

The second interconnecting unit 804 receives the number of switch ports and each switch number from the switch arranging unit 802.

Thereafter, the second interconnecting unit 804 obtains the connections that connect the first-stage switches to the second-stage switches using the connecting method of the first embodiment. Thereafter, the second interconnecting unit 804 outputs the obtained interconnections to the display controlling unit 805.

The display controlling unit 805 displays the first-stage to third-stage switches on the screen according to an instruction from the switch arranging unit 802. Thereafter, the display controlling unit 805 displays the connection between the second-stage switches and the third-stage switches on the screen according to the interconnections received from the first interconnecting unit 803. Thereafter, the display controlling unit 805 displays the connection between the first-stage switches and the second-stage switches on the screen according to the interconnections received from the second interconnecting unit 804.

Figure 11:
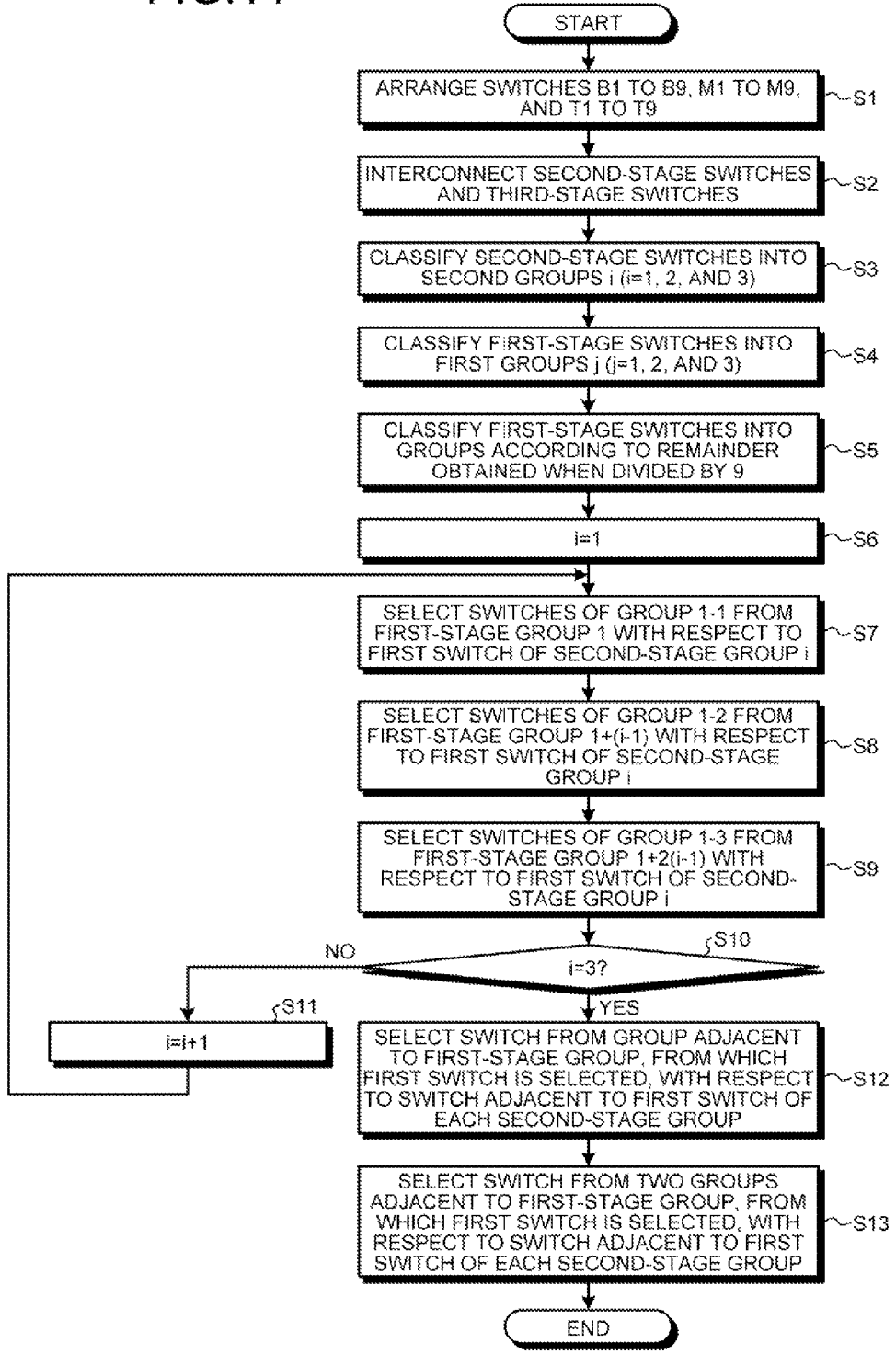
FIG. 11 is a flow chart illustrating the determination of connections between the first-stage switches and the second-stage switches.

A flow of determining the connections between the first-stage switches and the second-stage switches will be described below with reference to FIG. 11. FIG. 11 is a flow chart illustrating the determination of the connections between the first-stage switches and the second-stage switches. A three-stage configuration using the 6-port switches illustrated in FIG. 1 will be described below as an example. Further, in the following description, when each switch is illustrated, each switch is described with names to which the switch numbers illustrated in FIG. 1 are added. That is, each switch is represented by switches B1 to B9, M1 to M9, and T1 to T9. Further, each node is described with names to which the node numbers illustrated in FIG. 1 are added. That is, each node is represented by nodes 1 to 27.

In step S1, the switch arranging unit 802 arranges switches B1 to B9 as first-stage switches, arranges switches M1 to M9 as second-stage switches, and arranges switches T1 to T9 as third-stage switches.

Thereafter, the first interconnecting unit 803 classifies the second-stage and third-stage switches into groups in numerical order by number corresponding to the half of the number of ports of the second-stage switches. Thereafter, in step S2, the first interconnecting unit 803 mutually connects all switches of the second-stage switch groups to all switches of the third-stage switch groups, which vertically correspond to one another.

In step S3, the second interconnecting unit 804 classifies the second-stage switches into three second-stage groups i (i=1, 2, 3) in order of switch number. In the second-stage groups, the group number is sequentially increased from the group 1, and the group number is returned to the group 1 when the group number becomes the group 3. That is, the second-stage group 4 becomes the second-stage group 1.

In step S4, the second interconnecting unit 804 classifies the first-stage switches into three first-stage groups j (j=1, 2, 3) in order of switch number. In the first-stage groups, the group number is sequentially increased from the group 1, and the group number is returned to the group 1 when the group number becomes the group 3. That is, the first-stage group 4 becomes the first-stage group 1.

Further, the second interconnecting unit 804 classifies the switches of the first-stage switches, which have the same remainders when the minimum node numbers of the connected nodes are divided by 9, into the same groups. That is, the switches B1 to B9 are classified into three groups of the switches B1, B4, and B7, the switches B2, B5, and B8, and the switches B3, B6, and B9. In step S5, the switches B1, B4, and B7 will be referred to as the group 1-1. Further, the switches B2, B5, and B8 will be referred to as the group 1-2. Further, the switches B3, B6, and B9 will be referred to as the group 1-3.

In step S6, the second interconnecting unit 804 sets i=1.

In step S7, the second interconnecting unit 804 selects the switch of the group 1-1 from the first-stage group 1 with respect to the first switch whose switch number of the second-stage group i is minimum.

Thereafter, in step S8, the second interconnecting unit 804 selects the switch of the group 1-2 from the first-stage group 1+(i−1) with respect to the first switch of the second group i.

Further, in step S9, the second interconnecting unit 804 selects the switch of the group 1-3 from the first-stage group 1+2(i−1) with respect to the first switch of the second group i.

In step S10, the second interconnecting unit 804 determines whether i=3. If not i=3 (NO in step S10), the second interconnecting unit 804 sets i=i+1 in step S11 and returns to step S7.

On the contrary, if i=3 (YES in step S10), the second interconnecting unit 804 extracts the group adjacent to the first-stage group selected relative to the first switch in each selection of the groups 1-1 to 1-3, with respect to the switch adjacent to the first switch of the second-stage group. Thereafter, in step S12, the second interconnecting unit 804 selects the switch of the same group, from which the first switches of the groups 1-1 to 1-3 are selected, from the extracted first-stage group, with respect to the first switch adjacent from the first switch.

Further, the second interconnecting unit 804 extracts the second group adjacent from the first-stage group selected relative to the first switch in each selection of the groups 1-1 to 1-3, with respect to the second switch adjacent from the first switch of each second-stage group. Thereafter, in step S13, the second interconnecting unit 804 selects the switch of the same group, from which the first switches of the groups 1-1 to 1-3 are selected, from the extracted first-stage group, with respect to the second switch adjacent from the first switch.

In the exemplary embodiment, although the case of the connecting method of the first embodiment has been described, the cases of the second and third embodiments are equally applied.

As described above, the network managing apparatus according to the exemplary embodiment provides the connection state that can minimize the average number of hops and secure a wide bandwidth in signal transmission. Therefore, a user can easily know the connection state that can minimize the average number of hops and secure a wide bandwidth in signal transmission, and can rapidly construct an appropriate network.

Figure 12:
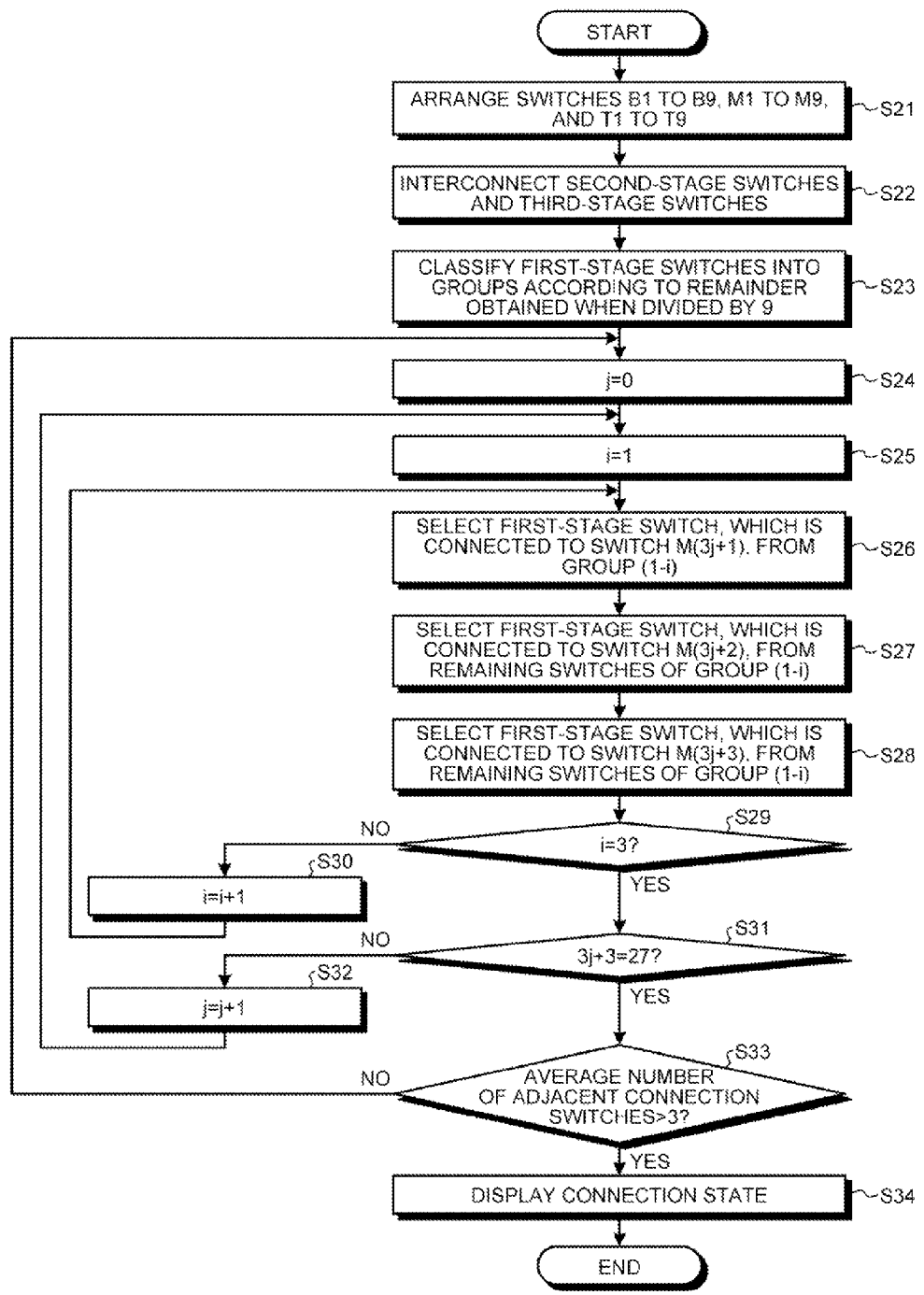
FIG. 12 is a flow chart illustrating another example of the determination of connections between the first-stage switches and the second-stage switches.

Further, another example of a flow of determining connections between the first-stage switches and the second-stage switches will be described with reference to FIG. 12. FIG. 12 is a flow chart illustrating another example of the determination of connections between the first-stage switches and the second-stage switches. A three-stage configuration using the 6-port switches illustrated in FIG. 1 will be described as an example. Further, in the following description, when each switch is illustrated, each switch is described with names to which the switch numbers illustrated in FIG. 1 are added. That is, each switch is represented by switches B1 to B9, M1 to M9, and T1 to T9. Further, each node is described with names to which the node numbers illustrated in FIG. 1 are added. That is, each node is represented by nodes 1 to 27.

In step S21, the switch arranging unit 802 arranges switches B1 to B9 as first-stage switches, arranges switches M1 to M9 as second-stage switches, and arranges switches T1 to T9 as third-stage switches.

Thereafter, the first interconnecting unit 803 classifies the second-stage and third-stage switches into groups in numerical order by number corresponding to the half of the number of ports of the second-stage switches. Thereafter, in step S22, the first interconnecting unit 803 mutually connects all switches of the second-stage switch groups to all switches of the third-stage switch groups, which vertically correspond to one another.

Thereafter, the second interconnecting unit 804 classifies the switches of the first-stage switches, which have the same remainders when the minimum node numbers of the connected nodes are divided by 9, into the same groups. That is, the switches B1 to B9 are classified into three groups of the switches B1, B4, and B7, the switches B2, B5, and B8, and the switches B3, B6, and B9. In step S23, the switches B1, B4, and B7 will be referred to as the group 1-1. Further, the switches B2, B5, and B8 will be referred to as the group 1-2. Further, the switches B3, B6, and B9 will be referred to as the group 1-3.

Further, in step S24, the second interconnecting unit 804 sets j=0.

Further, in step S25, the second interconnecting unit 804 sets i=1.

In step S26, the second interconnecting unit 804 selects the first-stage switch, which is connected to a switch M(3j+1), from the group (1−i).

Thereafter, in step S27, the second interconnecting unit 804 selects the first-stage switch, which is connected to a switch M(3j+2), from the remaining switches of the group (1−i).

Thereafter, in step S28, the second interconnecting unit 804 selects the first-stage switch, which is connected to a switch M(3j+3), from the remaining switches of the group (1−i).

In step S29, the second interconnecting unit 804 determines whether i=3. If not i=3 (NO in step S29), the second interconnecting unit 804 sets i=i+1 in step S30, and returns to step S26.

On the contrary, if i=3 (YES in step S29), the second interconnecting unit 804 determines whether 3j+3=27 in step S31. If not 3j+3=27 (NO in step S31), the second interconnecting unit 804 sets j=j+1 in step S32 and returns to step S25.

On the contrary, if 3j+3=27 (YES in step S31), the second interconnecting unit 804 determines whether the average of the adjacent connection switches for the first-stage switch is greater than 3 in step S33. If the average of the adjacent connection switches is 3 or less (NO in step S33), the second interconnecting unit 804 returns to step S24.

On the contrary, if the average of the adjacent connection switches is greater than 3 (YES in step S33), the second interconnecting unit 804 determines a connection state between the first-stage switch and the second-stage switch. Thereafter, in step S34, the display controlling unit 805 displays, on a displaying unit, a state in which each switch arranged by the switch arranging unit 802 is connected by an interconnection determined by the first interconnecting unit 803 and the second interconnecting unit 804.

It has been described above that a connection is computed because the number of adjacent connection switches is larger than that of the conventional Fat Tree configuration. However, this may be implemented by any other methods. For example, the second interconnecting unit 802 may perform the process of steps S4 to S9 with respect to the combination of all the first-stage switches, memorize the average of the number of adjacent connection switches in each case, and determine an interconnection that maximizes the average value.

According to an aspect of the network apparatus and the network managing apparatus, a wide band can be secured and a delay can be reduced in all-to-all signal transmission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network apparatus, comprising:
   $n^2$ first signal forwarding units that are connected in one-to-one correspondence to $n^2$ combinations of signal transmitting/receiving devices which are generated by classifying $n^3$ signal transmitting/receiving devices having $n^3$ addresses of serial numbers into groups having n sequential addresses from the minimum address, receive n signals, which are different in terms of the remainder of a destination address divided by n, from the signal transmitting/receiving device which belongs to corresponding combination, and transmit the received signals to n different destinations,
   $n^2$ second signal forwarding units that receive n signals, which are equal in terms of the remainder of a destination address divided by n, from the different first signal forwarding units and transmit the received signals to a destination corresponding to the remainder of a destination address of each of the received signals divided by $n^2$;
   $n^2$ third signal forwarding units that have a Fat Tree configuration with respect to each of the second signal forwarding unit, receive n signals, which are equal in terms of the remainder of a destination address divided by $n^2$, from n different second signal forwarding units, and output the received signal to the second signal forwarding unit connected to the first signal forwarding unit connected to the signal transmitting/receiving device having a destination address of the received signal; and
   a bottom connection path disposed between the first signal forwarding units and the second signal forwarding units constituting the Fat Tree together with the third signal forwarding units and configured to interchange a connection point of one or more second signal forwarding units and a connection point of another one or more second signal forwarding units in a Fat Tree configuration between the first signal forwarding units and the second signal forwarding units.

2. The network apparatus according to claim 1, wherein a portion of the first signal forwarding unit and a portion of the signal transmitting/receiving devices are removed.

3. The network apparatus according to claim 1, wherein:
   the second signal forwarding units and the third signal forwarding units are classified into groups i (i=1, 2, . . . , n) on an n-to-n basis, and the second signal forwarding unit included in each of the groups i are connected to all of the third signal forwarding units included in the group i;
   the second signal forwarding units of the group i transmit signals having remainders of i, i+n, i+2n, . . . , i+(n−1)n of a destination address divided by $n^2$ to the third signal forwarding units corresponding to the remainders of the destination address divided by n2, and each of the second signal forwarding units of the group i receives a signal having a remainder of one of i, i+n, i+2n, . . . , i+(n−1)n from one different first signal forwarding unit of the first signal forwarding units receiving signals from the signal transmitting/receiving devices having addresses, which are equal in terms of the remainder of division by $n^2$, receives signals from the first signal forwarding unit that is discontinuous in terms of the address of a signal transmitting/receiving device connected to the first signal forwarding unit transmitting signals received from the second signal forwarding units of one or more groups, and transmits a signal received from the third signal forwarding unit to the first signal forwarding unit connected to the signal transmitting/receiving device having a destination address; and
   the first signal forwarding unit transmits a signal received from the second signal forwarding unit to the signal transmitting/receiving device having a destination address.

4. The network apparatus according to claim 3, wherein the first signal forwarding units are classified into first-stage groups, in which the addresses of the signal transmitting/receiving devices are 1 to $n^2$, $1+n^2$ to $2n^2$, . . . , $1+(n-1)n^2$ to $n^3$, numbers are designated as 1 to n in ascending order of address, and n (n×n) matrixes having a row containing the numbers of the first-stage groups including the first signal forwarding units connected to the second signal forwarding units included in each group of the second signal forwarding units are mutually-orthogonal Latin squares.

5. The network apparatus according to claim 1, wherein:
   the signal transmitting/receiving devices are given 1 to $n^3$ addresses of serial numbers; and
   the first signal forwarding units are connected in one-to-one correspondence with one of the combinations of the signal transmitting/receiving devices having combinations of the addresses of 1 to n, n+1 to 2n, 2n+1 to 3n, . . . , or $(n^2-1)n+1$ to $n^3$.

6. A network managing apparatus comprising:
   a switch arranging unit to that arrange, on an arrangement diagram, $n^2$ first switches that are connected in one-to-one correspondence to $n^2$ combinations of signal transmitting/receiving devices which are generated by classifying $n^3$ signal transmitting/receiving devices having $n^3$ addresses of serial numbers into groups having n sequential addresses from the minimum address, receive n signals, which are different in terms of the remainder of a destination address divided by n, from the signal transmitting/receiving device which belongs to corresponding combination, and transmit the received signals to n different destinations, $n^2$ second switches that receive n signals, which are equal in terms of the remainder of a destination address divided by n, from the different first switches and transmit the received signals to a destination corresponding to the remainder of a destination address of each of the received signals divided by $n^2$, and $n^2$ third switches that receive n signals, which are equal in terms of the remainder of a destination address divided by $n^2$, from n different second switches, and transmit the received signal to the second switch connected to the first switch connected to the signal transmitting/receiving device having a destination address of the received signal;

a first interconnecting unit configured to compute an interconnection such that the second switches and the third switches are classified into groups i (i=1, 2, ..., n) on an n-to-n basis, the second switch included in each of the groups i are connected to all of the third switches included in the group i, and the second switches of the group i transmit signals having remainders of i, i+n, i+2n, ..., i+(n−1)n of a destination address divided by n2 to the third switches corresponding to the remainders of the destination address divided by n2; and a second interconnecting unit configured to compute an interconnection between the first switches and the second switches such that each of the second switches of the group i receives a signal having a remainder of one of i, i+n, i+2n, ..., i+(n−1)n of a destination address divided by n2 from one different first switch of the first switches receiving signals from the signal transmitting/receiving devices having addresses, which are equal in terms of the remainder of division by n2, and receives signals from the first switches that are discontinuous in terms of the address of the signal transmitting/receiving device connected to the first switches transmitting signals received from the second switches of one or more groups.

* * * * *